US008458715B1

(12) United States Patent
Khosla et al.

(10) Patent No.: US 8,458,715 B1
(45) Date of Patent: Jun. 4, 2013

(54) SYSTEM FOR ALLOCATING RESOURCES TO OPTIMIZE TRANSITION FROM A CURRENT STATE TO A DESIRED STATE

(75) Inventors: Deepak Khosla, Camarillo, CA (US); James Guillochon, San Diego, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1412 days.

(21) Appl. No.: 12/070,865

(22) Filed: Feb. 21, 2008

Related U.S. Application Data

(60) Provisional application No. 60/903,240, filed on Feb. 23, 2007.

(51) Int. Cl.
*G06F 9/46* (2006.01)
*G06F 19/00* (2011.01)
*G06F 15/00* (2006.01)

(52) U.S. Cl.
USPC ............................ 718/104; 702/104; 702/127

(58) Field of Classification Search
None
See application file for complete search history.

(56) References Cited

U.S. PATENT DOCUMENTS

| 6,801,878 | B1 * | 10/2004 | Hintz et al. | 702/188 |
| 6,907,304 | B1 * | 6/2005 | Hintz et al. | 700/99 |
| 7,991,722 | B1 * | 8/2011 | Hintz | 706/45 |
| 2005/0172291 | A1 * | 8/2005 | Das et al. | 718/104 |

OTHER PUBLICATIONS

W. Schmaedeke, "Information based sensor management," Signal Processing, Sensor Fusion, and Target Recognition 11. Proceedings of the SPIE—The International Society for Optical Engineering, vol. 1955, Orlando, FL, Apr. 12-14, 1993, pp. 156-164.

W. Schmaedeke, et al, "Information based sensor management and IMMKF," Signal and Data Processing of Small Targets 1998: Proceedings of the SPIE—The International Society for Optical Engineering, vol. 3373, Orlando, FL, Apr. 1998, pp. 390-401.

K. Kastella, "Discrimination gain to optimize detection and classification," IEEE Transactions on Systems, Man, and Cybernetics, Part A: Systems and Humans, vol. 27, No. 1, pp. 112-116, Jan. 1997.

G.A. McIntyre, et al., "An information theoretic approach to sensor scheduling," Signal Processing, Sensor Fusion, and Target Recognition V. Proceedings of the SPIE—The International Society for Optical Engineering, vol. 2755, Orlando, FL, Apr. 8-10, 1996, pp. 304-312.

V. Krishnamurthy, "Algorithms for optimal scheduling and management of hidden Markov model sensors," IEEE Trans. Signal Process. 50 (6) (2002) 1382-1397.

V. Krishnamurthy, et al., "Hidden Markov model multiarm bandits: a methodology for beam scheduling in multitarget tracking," IEEE Trans. Signal Process. 49(12) (2001) 2893-2908.

D.P. Bertsekas, et al., "Rollout algorithms for stochastic scheduling problems," J. Heuristics, 5 (1) (1999) 89-108.5.

(Continued)

*Primary Examiner* — Meng An
*Assistant Examiner* — Tammy Lee
(74) *Attorney, Agent, or Firm* — Tope-McKay & Associates

(57) ABSTRACT

Described is a Distributed Resource Allocation System (DRAS) for sensor control and planning. The DRAS comprises an information framework module that is configured to specify performance goals, assess current performance state, and includes sensor models to achieve the performance goals. The DRAS is configured to further allocate the sensors to achieve the performance goals. Once allocated, the DRAS then reassesses the current performance state and continues reallocating the sensors until the current performance state is most similar to the performance goals.

33 Claims, 10 Drawing Sheets

OTHER PUBLICATIONS

R. Malhotra, "Temporal considerations in sensors management," Proceedings of the IEEE 1995 National Aerospace and Electronics Conference, NAECON, vol. 1, Dayton, OH, May 22-26, 1995, pp. 86-93.

K.J. Hintz, "A measure of the information gain attributable to cueing," IEEE Signal Process. Mag. (Special Issue on Math. Imaging) 19 (5) (2002) 85-95.

K.J. Hintz, et al., "Multi-process constrained estimation," IEEE Trans. Man Systems Cybernet. 21, (1991) 237-244.

W. Schmaedeke, et al., "Event-averaged maximum likelihood estimation and information-based sensor management," Proceedings of SPIE, vol. 2232, Orlando, FL, 1994, pp. 91-96.

M.K. Schneider, et al., "Closing the loop in sensor fusion systems: stochastic dynamic programming approaches," Proceedings of the 2004 American Control Conference vol. 5, pp. 4752-4757, 2004.

R.E. Kalman, "A new approach to linear filtering and prediction problems," Transactions of the ASME—Journal of Basic Engineering, 82(D), 35-45, 1960.

M.J. Kearns, et al., "A sparse sampling algorithm for near-optimal planning in large Markov decision processes," Proceeding of the Sixteenth International Joint Conference on Artificial Intelligence, T. Dean (Ed.), pp. 1324-1331, Morgan Kaufmann, 1999.

M.J. Kearns, et al., "A sparse sampling algorithm for near-optimal planning in large Markov decision processes," Machine Learning, 49 (2-3), pp. 193-208, 2002.

A.W. Stroupe, et al., "Distributed sensor fusion for object position estimation by multi-robot systems," Robotics and Automation, 2001, Proceedings 2001 ICRA, IEEE International Conference on, vol. 2, no. pp. 1092-1098, vol. 2, 2001.

X. Wang, et al., "Multilevel decision fusion in a distributed active sensor network for structural damage detection," Structural Health Monitoring 2006, 5: 45-58.

S. Thomopoulos, et al., "Optimal and suboptimal distributed decision Fusion," 1988 American Control Conference, 7th, Atlanta, Ga, United States, Jun. 15-17, 1988, pp. 414-418, 1988.

L. Xiao, et al., "A scheme for robust distributed sensor fusion based on average consensus," Information Processing in Sensor Networks, 2005, IPSN 2005, Fourth International Symposium on, vol., pp. 63-70, Apr. 15, 2005.

R.R. Brooks, "Distributed Target classification and tracking in sensor networks," Signal Processing Magazine, IEEE, vol. 19, No. 2, pp. 17-29, 2002.

A. D'Costa, et al., "Data versus decision fusion for distributed classification in sensor networks," Military Communications Conference, 2003, MILCOM 2003, IEEE, vol. 1, pp. 585-590, 2003.

T. Clouqueur, et al., "Value-fusion versus decision-fusion for fault-tolerance in collaborative target detection in sensor networks," Proceedings of Fourth International Conference on Information Fusion, Aug. 2001.

A. Mkarenkno, et al., "Decentralized data fusion and control in active sensor networks," 7th Int. Conf. on Info. Fusion (Fusion '04).

J.M. Manyika, "An Information-theoretic approach to management in decentralized data fusion," Proceedings of SPIE, vol. 202, 1992.

B. Grocholsky, "An Information-theoretic approach to decentralized control of multiple autonomous flight vehicles," Proceedings of SPIE, vol. 4196, pp. 348-359, 2000.

J. Zahng, et al., "Resource management of task oriented distributed sensor networks," Circuits and Systems, 2001, ISCAS 2001, The 2001 IEEE International Symposium on, vol. 3, pp. 513-516, 2001.

P. Ogren, et al., "Cooperative control of mobile sensor networks: adaptive gradient climbing in a distributed environment," Automatic Control, IEEE Transactions on, vol. 49, No. 8, pp. 1292-1302, 2004.

N. Xiong, P. Svensson, "Multi-sensor management for information fusion: issues and approaches," Information Fusion, vol. 3, No. 2, pp. 163-186, 2002.

H.R. Hashemipour, et al., "Decentralized structures for parallel kalman filtering," Automatic Control, IEEE Transactions on, vol. 33, No. 1, pp. 88094, 1988.

L.Y. Pao, et al., "Control of Sensor information in distributed multisensor systems," American Control Conference, vol. 4, pp. 2397-2401, 1999.

H. Wang, et al., "Information-theoretic approaches for sensor selection and placement in sensor networks for target localization and tracking," Journal of Communications and Networks, vol. 7, No. 4, pp. 438-449, Dec. 2005.

M. Chu, "Scalable information-driven sensor querying and routing for ad hoc heterogeneous sensor networks," International Journal of High Performance Computing Applications, vol. 16, No. 3, pp. 293-313, 2002.

B. Horling, et al., "Using and maintaining organization in a large-scale sensor network," Proc. of Workshop on Autonomy, Delegation, and Control, 2003.

C. Intanagonwiwat, et al., "Direction diffusion: a scalable and robust communication paradigm for sensor networks," Proceedings of the ACM/IEEE International Conference on Mobile Computing and Networking, pp. 56-67, 2000.

M. Rabbat, et al., "Distributed optimization in sensor networks," Proceedings of the third international symposium on information processing in sensor networks, pp. 20-27, 2004.

A. Savkin, "The problem of optimal robust sensor scheduling," vol. 1, 3791, Paper No. 1250, CDC 2000.

J.M. Nash, "Optimal allocation of tracking resources," Proceedings of the 1977 IEEE Conference on Decision and Control, vol. 1, New Oreans, LA, Dec. 7-9, 1977, pp. 1177-1180.

J.M. Manyika, et al., "On sensor management in decentralized data fusion," Proceedings of the 31st Conference on Decision and Control, vol. 4, Tucson, AZ, Dec. 16-18, 1992, pp. 3506-3507.

A. Gaskell, et al., "Sensor models and a framework for sensor management," Sensor Fusion VI, Proceedings of the SPIE—the International Society for Optical Engineering, vol. 2059, Boston, MA, Sep. 7-8, 1993, pp. 2-13.

S. Kullback, et al., "On information and sufficiency," The Annals of Mathematical Statistics, vol. 22, pp. 79-86.

R.P.S. Mahler, "Global posterior densities for sensor management," Acquisition, Tracking, and Pointing XII, Proceedings of the SPIE—The International Society of Optical Engineering, vol. 3365, Orlando, FL, Apr. 1998, pp. 252-263.

R.P.S. Mahler, "Multisource, Multitarget Filtering: A unified approach," Signal and Data Processing, of Small Targets 1998, Proceedings of the SPIE—The International Society for Optical Engineering, vol. 3373, Orlando, FL, Apr. 1998, pp. 296-307.

S. Musick, et al., "A practical implementation of joint, multitarget probabilities," Signal Processing, Sensor Fusion, and Target Recognition VII: Proceedings of the SPIE—The International Society for Optical Engineering, vol. 2232, Orlando, Fl, Apr. 1998, pp. 26-37.

H. Qi, et al., "Multisensor data fusion in distributed sensor networks using mobile agents," Proceedings of 5th International Conference on Information Fusion, Annapolis, MD, 2005.

F. Zhao, et al., "Information-Driven dynamic sensor collaboration for tracking applications," IEEE Signal Processing Magazine, vol. 19, No. 2, pp. 61-72, 2002.

J.M. Molina Lopez, et al., "Fuzzy reasoning for multisensor management," 1995 IEEE International Conference on Systems, Man, and Cybernetics, vol. 2, Vancouver, Brithish Columbia, Canada, Oct. 22-25, 1995, pp. 1398-1403.

K. Kastella, et al., "Discrimination gain for sensor management in multitarget detection and tracking," IEEE-SMC and IMACS Multiconference CESA'96, vol. 1, Lille France, Jul. 9-12, 1996, pp. 167-172.

K. Kastella, et al., "Comparison of Sensor management strategies for detection and classification," 9th National Symposium on Sensor Fusion, Monterey, CA, Mar. 1996.

* cited by examiner

SYSTEM FOR ALLOCATING RESOURCES TO OPTIMIZE TRANSITION FROM A CURRENT STATE TO A DESIRED STATE

PRIORITY CLAIM

The present application is a non-provisional patent application, claiming the benefit of priority of U.S. Provisional Application No. 60/903,240, filed on Feb. 23, 2007, entitled, "Sensor Resource Allocation System."

FIELD OF INVENTION

The present invention relates to a Distributed Resource Allocation System and, more specifically, to a system for optimizing sensor resource allocation, scheduling and tasking to best meet user information collection requirements.

BACKGROUND OF INVENTION

Sensor Resource Management (SRM) is defined as a control problem for allocating available sensor resources to obtain the best awareness of a situation. SRM is important in terms of the benefits it provides over non-coordinated sensor operation. By automating the process, it reduces operator workload. In an SRM system, an operator defines sensor tasking criteria instead of controlling multiple sensors individually by specifying each operation to be performed by each sensor. In an automated SRM system, the operator concentrates on an overall objective while the system controls the details of the sensor operations. Additionally, the feedback within the SRM system allows for faster adaptation to the changing environment. Traditional problems that SRM deals with include insufficient sensor resources, a highly dynamic environment, varied sensor capabilities/performance, failures, etc. Desired characteristics of a good sensor manager are that it should be goal oriented, adaptive, anticipatory, account for sensor dissimilarities, perform in near real time, handle adaptive length planning horizons, etc.

In all sensor management systems, there will be a notion of system goal and system action. Both of these can be modeled and addressed using many methods, most of which fall into one of the following categories: control theory, optimization, and decision theory.

Control Theory:

In the control theory, one specifies the desired level of performance (or the reference trajectory) defining the management goal that the closed-loop system tries to achieve (see literature reference no. 38 in the List of Cited Literature References, as provided below). The error index is used as an action selection basis to reduce, and/or maintain as small as possible, any observable discrepancy.

Optimization:

If sensor management is modeled as an optimization problem, rather than specifying a desired performance level, the user defines a cost function that, once optimized, leads to the most desirable outcome. This optimization would lead to the best trade-off between the sensing action payoff and the associated costs. Optimization-based algorithms are among the techniques that have been applied the most to the sensor management problem. For example, Nash (see literature reference no. 39) uses linear programming to determine sensor-to-target assignment by using the trace of the Kalman filter error covariance matrices as the objective function. Malhotra (see literature reference no. 40) uses Dynamic Programming for solving a Markov process that determines minimum costs based on the final state and then works backwards. Washburn, et al. (see literature reference no. 41) present a sensor management approach based on dynamic programming to predict the effects of future sensor management decisions.

Decision Theory:

When a decision formulation is used, there is no clear notion of level of performance. As in the case of the optimization formulation, the objective is to choose the action that maximizes some expected utility function. Therefore, what is specified is the utility of executing a given action in a given situation. The best solution is the one that offers the highest utility (i.e., the best achievable performance). Solving such a decision problem can be done efficiently using graphical methods such as decision trees or influence diagrams. Performance objectives can be injected indirectly into decision trees as membership or belief functions of leaf nodes. Fung, et al., (see literature reference no. 42) use a decision theoretic sensor management architecture based on Bayesian probability theory and influence diagrams. Alternatively, Manyika and Durrant-Whyte (see literature reference no. 43) use a decision theoretic approach to sensor management in decentralized data fusion while Gaskell and Probert (see literature reference no. 44) develop a sensor management framework for mobile robots. Molina López, et al. (see literature reference no. 45) present a sensor management scheme based on knowledge-based reasoning and fuzzy decision theory.

Use of information-theoretic measures (such as entropy) for sensor management has been around for many years now. Most of the literature is in the area of managing sensors to maximize kinematic information gain only (see literature reference nos. 1-2). Some references exist regarding managing sensors for maximizing identification and search capabilities (see literature reference nos. 3-4). This is done without any consideration for the system's current situation and performance. One can use information-theoretic criteria such as entropy, discrimination information, mutual information, etc. In these cases, the goal is to determine tasks that maximize the information gain at a system-wide level and priorities are assigned based on this goal. Thus, it is an open-loop approach to managing sensors. Recent work on finite set statistics (FISST) and Joint multi-target probabilities (JMP—a subset of FISST) can also be applied in this context. The advantage of JMP is that there is a global notion of system task priority with all task priorities in a common space.

Examples of such applications are as follows. Hintz and McVey (see literature reference no. 46) used entropy for search, track and identification tasks. Literature reference nos. 47-54 describe using information measures such as entropy and discrimination gain for goals (such as determining resolution level of a sensor, determining priority of search and track tasks, etc.). Hintz et al. (see literature reference nos. 9 and 10) describes the use of Shannon entropy (as does the present invention), while Schmaedeke and Kastella (see literature reference no. 11) have chosen to use Kullback-Leibler (KL) divergence as a measure of information gain. Mahler (see literature reference nos. 56-58) proposed finite set statistics (FISST) which reformulates the problem of multi-sensor, multi-target data fusion as if it were a single-sensor, single-target tracking problem. It is then posed as a problem in statistical optimal nonlinear control theory. Musick, et al. (see literature reference no. 59) applied joint multi-target probabilities (JMP), a subset of FISST, to the problem of target detection and tracking.

Fusion and management for distributed systems must also be considered. When dealing with substantially different information that is received from multiple sources at different times, an efficient and accurate fusion method is required. To satisfy such a requirement, Zhang et al. (see literature reference no. 27) and Wang et al. (see literature reference no. 17) propose the use of a hierarchical decision fusion. As decisions are passed up a tree of intermediate levels, certain nodes are given higher weights than other nodes depending on the quality of the fused information. Alternatively, Stroupe et al. (see literature reference no. 16) apply distributed fusion to a network of independent robots. Stroupe et al. continue by explaining how to properly fuse measurements received from different frames of reference. Thomopoulos et al. (see literature reference no. 18) offers yet another approach. Thomopolous et al. provide a general proof that the optimal solution to distributed fusion amounts to a Neyman-Pearson test at the fusion center and a likelihood-ratio test at the individual sensors. A method proposed by Xiao et al. (see literature reference no. 19) involves a different approach, where each node updates its own data with a weighted average of its neighboring nodes. Qi et al. (see literature reference no. 20) detail a system of mobile agents which travel between local data sites by transmitting themselves from one node to the next. Such a system has the advantage of only having to transmit the agent itself, rather than the data, which could be several times larger in size. Finally, a discussion of the pros and cons of data and decision fusion is provided by Brooks et al., D'Costa and Sayeed, and Clouqueuer et al. (see literature reference nos. 21-23, respectively).

A variety of distributed management methods have been explored as well. For example, Durrant-Whyte et al. have primarily used information-theoretic approaches to address the problem (see literature reference nos. 24-26 and 43). Durrant-Whyte et al. describe using entropy measures to determine the relative values of possible actions. Xiong et al. (see literature reference no. 29) builds upon Durrant-Whyte's work and discuss a number of different approaches and issues when using information-centric methods in a distributed framework. An alternative is described by Ögren (see literature reference no. 28). Ögren describes using gradient methods to determine the best placement for a system of distributed sensors. Ögren's method involves setting up artificial potentials and letting these virtual force models converge to a global solution. Alternatively, Maholtra (see literature reference no. 8) addresses the impact of receiving measurements at different times, and how to properly model temporal effects.

Temporal effects often result in future actions and the need to plan for such future actions. When planning future actions, one can choose how far ahead (in time) to search when trying to pick the optimal action. Short-term (or myopic) approaches only look ahead one step; the goal of the planner is to pick the action that will yield the best result after the action is executed. Long-term methods explore many actions into the future. Their goal is to choose an action that will yield the best result after a certain number of actions have been performed. The differences between these two options are illustrated in FIG. 1.

FIG. 1 illustrates a state and decision space 100, showing a comparison of short-term and long-term planning approaches. As shown, short-term planning 102 evaluates the reward (improvement in system state) versus the cost of an action for a single-step look ahead. The short-term planning uses the evaluation to determine the optimal action. However, although such short-term planning may be computationally cheap, the best immediate action may not be the optimal action. Alternatively, long-term planning 104 evaluates the reward (improvement in system state) versus the cost of action for multiple look ahead steps to determine the optimal action to take. Thus, long-term planning 104 compares the action sequences for multiple steps in the future. Although long-term planning 104 is computationally expensive, it results in a non-myopic, better optimality.

Long-term approaches have the potential to produce the best results, but the computation time required for even simple environments is enormous when compared to short-term approaches. Several researchers have come up with solutions that provide approximate answers to reduce the computation time.

A large number of SRM problems can be formulated as belonging to the class of Markov Decision Process (MDP) problems. In a MDP, future states are assumed to be the result of applying actions to the current state, ignoring the total history of the state space. In centralized management, nodes with complete knowledge of the state space (full-awareness nodes, or FANs) maintain the current state, and update the state with incoming measurements or the passage of time. This new state can then be used to determine future states. Similarly, in a decentralized system, each node's state is only dependent on that node's prior state, input from the environment, and process noise, just like any other Markovian process. Each node maintains its own individual picture of the state space, but since inter-node communication is imperfect, these state representations are often dramatically different from node to node.

For example, Krishnamurthy describes a technique involves a multi-arm bandit method and that utilizes hidden Markov models (see literature reference nos. 5 and 6). Krishnamurthy employs two approaches which limit the number of states accessible to each track to a finite number. While these approximations improve computation time, they are all centralized methods and still very intensive. Bertsekas and Castanon (see literature reference no. 7) propose a method that uses heuristics to approximate a stochastic dynamic programming algorithm, while Malhotra (see literature reference no. 8) suggests using reinforcement learning.

Kearns, Mansour, and Ng have also previously proposed a sparse sampling algorithm (see literature reference no. 14) for Markov decision processes. The sparse sampling algorithm is exponential in the depth of the search tree and is not very applicable to practical problems. In addition, the reward function in the algorithm is based on information gain. A variety of distributed management methods and issues have been explored as well. However these distributed methods are myopic and do not address long-term planning.

The technique mentioned above is limited and incomplete because it cannot achieve multiple performance objectives in a quantifiable and systematic, closed-loop, control manner. Additionally, due to the several steps involved in arriving at the common metric and bringing the steps into the same framework, nothing heretofore devised provides a single system-level solution to sensor management.

Thus, a continuing need exists for a sensor resource allocation system that is configured to operate as a fully distributed, short-term/long-term planner.

SUMMARY OF INVENTION

As noted above, a need exists for a fully distributed, short-term/long-term planner. The present invention solves this need by providing a Distributed Resource (e.g., sensor) Allocation System (DRAS) this includes distributed resource managers that are configured to operate as short-term and long-term planners to determine an optimal allocation of a select set of resources.

More specifically, the DRAS comprises modules that are configured to optimize sensor resource allocation, scheduling and tasking to best meet user information collection requirements. The DRAS comprises a plurality of resources, each of the resources having a resource manager. Or stated in the alternative, the DRAS includes a plurality of resource managers, with each resource manager being assigned to and configured to manage a particular resource. Each resource manager has knowledge of its own resource capabilities and is configured to perform operations of receiving both a desired system state and a current system state and computing a difference between the desired system state and the current system state. If the difference between the current system state and the desired system state is less than or equal to a predetermined threshold, then exiting. Alternatively, if the difference between the current system state and the desired system state is greater than a predetermined threshold, then the system performs the following operations. Based on the resource capabilities and the current system state and desired system state, each resource manager independently determines an expected Rate of Information Gain (RIG) (where RIG is defined as gain divided by cost, where cost is usually the amount of time it would take to obtain that information gain) if used to move the current system state toward the desired system state. The expected RIG is communicated to other resource managers. The resource managers review the expected RIG s and collectively determine with other resource managers which resource has the highest expected RIG in moving the current system state to the desired system state. The resource with the highest expected RIG is then designated as an allocated resource to perform an allocated task in order to move the current system state toward the desired system state, with the remaining resources then being designated as unallocated resources having unallocated resource managers. The resource managers then compute an expected modified current system state due to the expected RIG of the allocated resource. The unallocated resource managers repeat the operations above until the plurality of resources have been allocated. Additionally, each allocated resource is further configured to perform the allocated task, which results in an updated current system state. Upon completion of the allocated task, each corresponding resource manager is configured to repeat operations listed above until the current system state has reached the desired system state, and then stopping.

When determining the expected RIG, each resource manager is configured to generate a possible allocation tree having a base representing a current system state and a plurality of step-wise nodes. Each node represents an expected modified current system state based on the possible allocation of the resource to a task and provides a possible expected gain for allocation of the resource to the task. The possible allocation tree is generated until a predetermined fixed horizon of planning. A total possible expected RIG is computed for each path from each node at the horizon of planning to the base. A total possible expected RIG is ordered for each path. The resource manager then determines a path with the highest total possible expected RIG. Finally, the path with the highest total possible expected RIG is used as the expected RIG to be communicated to other resource managers.

In another aspect, the resources are sensors.

In yet another aspect, the sensors are configured to observe the current system state and generate signals reflective of the current system state.

The present invention further comprises a fusion manager configured to receive signals from the sensors and generate an updated current system state.

Additionally, the sensors are configured to sense objects present in a scene.

In another aspect, the fusion manager includes a tracker module, where the tracker module is configured to track objects present in the scene.

In yet another aspect, the fusion manager includes a reasoner module, where the reasoner module is configured to identify objects present in the scene.

Additionally, the fusion manager is configured to track identified objects in the scene across multiple sensors.

In another aspect, each sensor includes a sensing range. The fusion manager is configured to track identified objects in the scene across multiple sensors, such that as the object travels from the sensing range of a first sensor and into the sensing range of a second sensor, the fusion manager coordinates the identification of the object from the first sensor to the second sensor to provide an updated current system state that reflects motion of the identified object from the first sensor to the second sensor.

Finally, as can be appreciated by one skilled in the art, the present invention also comprises a method and computer program product. The method comprising acts of performing the operations described herein, with the computer program product comprising instructing means for causing a computer to perform the relevant operations. As the present invention is a DRAS, each resource manager can effectively operate as its own computer to perform operations according to the instruction means.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
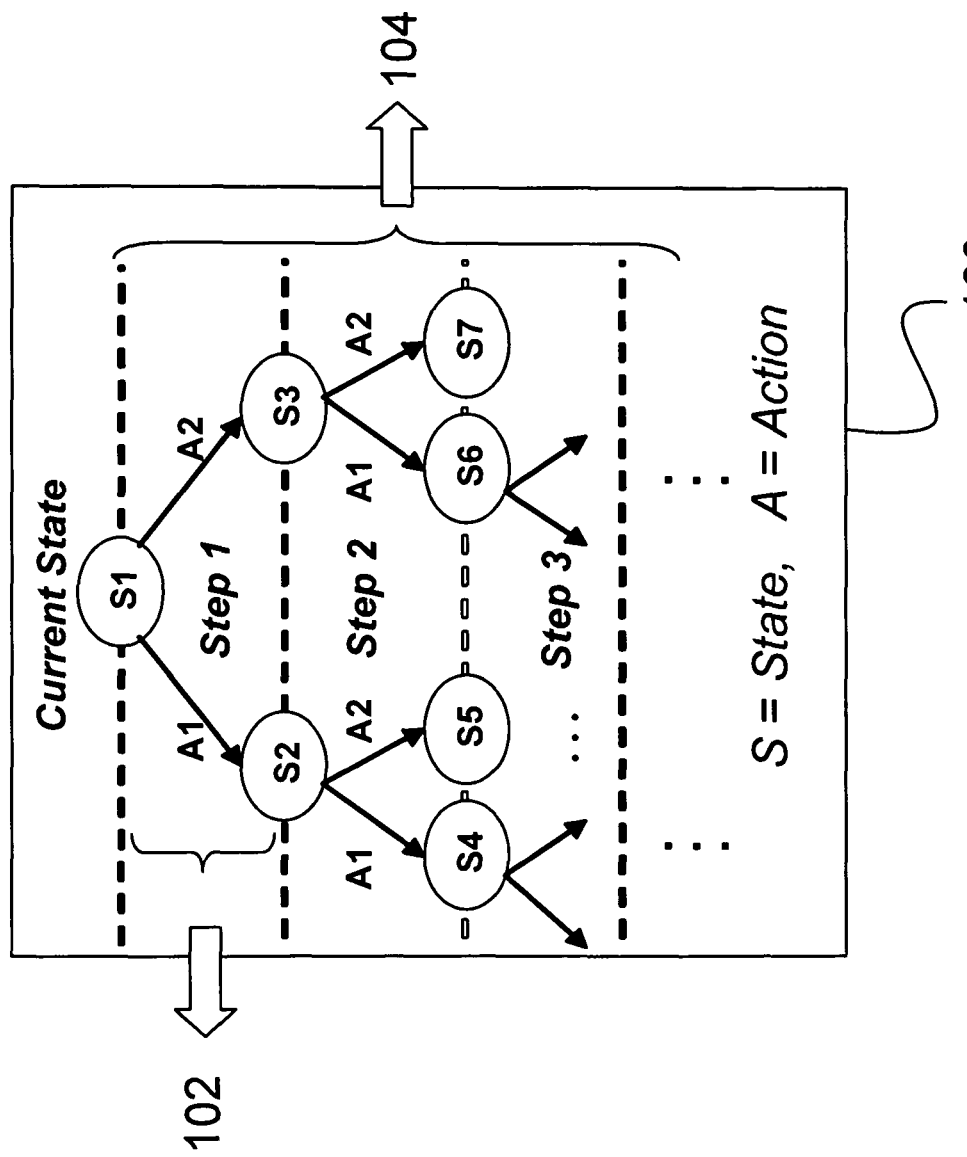
FIG. 1 is a flowchart illustrating state and decision space for short term and long term planning.

The present invention relates to a Distributed Resource Allocation System (DRAS) and, more specifically, to a system for optimizing sensor resource allocation, scheduling and tasking to best meet user information collection requirements. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a glossary of terms that are used in the description and claims is presented. Following the glossary, a description of various principal aspects of the present invention is provided. Subsequently, an introduction provides the reader with a general understanding of the present invention. Next, details of the present invention are provided to give an understanding of the specific aspects. Additionally, experimental results are presented to demonstrate the efficacy of the present invention. Finally, a summary is provided as a synopsis of the present invention.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number.

1. W. Schmaedeke, "Information Based Sensor Management," *Signal Processing, Sensor Fusion, and Target Recognition II. Proceedings of the Society of Photo-Optical Instrumentation Engineers (SPIE)—The International Society for Optical Engineering*, vol. 1955, Orlando, Fla., Apr. 12-14, 1993, pp. 156-64.
2. W. Schmaedeke and K. Kastella, "Information Based Sensor Management and IMMKF," *Signal and Data Processing of Small Targets 1998: Proceedings of the SPIE—The International Society for Optical Engineering*, vol. 3373, Orlando, Fla., April 1998, pp. 390-401.
3. K. Kastella, "Discrimination Gain to Optimize Detection and Classification," *Institute of Electrical and Electronic Engineers (IEEE) Transactions on Systems, Man, and Cybernetics, Part A: Systems and Humans*, vol. 27, no. 1, pp. 112-116, January 1997.
4. G. A. McIntyre and K. J. Hintz, "An Information Theoretic Approach to Sensor Scheduling," *Signal Processing, Sensor Fusion, and Target Recognition V. Proceedings of the SPIE—The International Society for Optical Engineering*, vol. 2755, Orlando, Fla., Apr. 8-10 1996, pp. 304-312.
5. V. Krishnamurthy, "Algorithms for optimal scheduling and management of hidden Markov model sensors," *IEEE Trans. Signal Process.* 50 (6) (2002) 1382-1397.
6. V. Krishnamurthy and D. Evans, "Hidden Markov model multiarm bandits: a methodology for beam scheduling in multitarget tracking," *IEEE Trans. Signal Process.* 49 (12) (2001) 2893-2908.
7. D. P. Bertsekas and D. Castanon, "Rollout algorithms for stochastic scheduling problems," *J. Heuristics,* 5 (1) (1999) 89-108.
8. R. Malhotra, "Temporal considerations in sensors management," *Proceedings of the IEEE National Aerospace and Electronics Conference (NAECON), vol.* 1, Dayton, Ohio, May 22-26, 1995, pp. 86-93.
9. K. J. Hintz, "A measure of the information gain attributable to cueing," *IEEE Signal Process. Mag. (Special Issue on Math. Imaging)* 19 (5) (2002) 85-95.
10. K. J. Hintz and E. S. McVey, "Multi-process constrained estimation," *IEEE Trans. Man Systems Cybernet.* 21 (1991) 237-244.
11. W. Schmaedeke and K. Kastella, "Event-averaged maximum likelihood estimation and information-based sensor management," *Proceedings of SPIE, vol.* 2232, Orlando, Fla., 1994, pp. 91-96.
12. M. K. Schneider., G. L. Mealy, and F. M. Pait, "Closing the Loop in Sensor Fusion Systems Stochastic Dynamic Programming Approaches," *Proceedings of the 2004 American Control Conference Volume* 5, pp. 4752-4757, 2004.
13. R. E. Kalman, "A New Approach to Linear Filtering and Prediction Problems," *Transactions of the American Society of Mechanical Engineers (ASME)—Journal of Basic Engineering,* 82(D), 35-45, 1960.
14. M. J. Kearns, Y. Mansour, and A. Y. Ng, "A Sparse Sampling Algorithm for Near-Optimal Planning in Large Markov Decision Processes," *Proceedings of the Sixteenth International Joint Conference on Artificial Intelligence,* T. Dean (Ed.), pp. 1324-1331, Morgan Kaufmann, 1999.
15. M. J. Kearns, Y. Mansour, and A. Y. Ng, "A Sparse Sampling Algorithm for Near-Optimal Planning in Large Markov Decision Processes," *Machine Learning,* 49(2-3), pp. 193-208, 2002.
16. A. W. Stroupe, M. C. Martin, and T. Balch, "Distributed sensor fusion for object position estimation by multi-robot systems," *Robotics and Automation,* 2001. *Proceedings 2001 ICRA. IEEE International Conference on,* vol. 2, no. pp. 1092-1098 vol. 2, 2001.
17. X. Wang, G. Foliente, Z. Su, and L. Ye, "Multilevel Decision Fusion in a Distributed Active Sensor Network for Structural Damage Detection," *Structural Health Monitoring* 2006 5: 45-58.
18. S. Thomopoulos, R. Viswanathan, D. Bougoulias, and L. Zhang, "Optimal And Suboptimal Distributed Decision Fusion," 1988 *American Control Conference, 7th*, Atlanta, Ga., United States, 15-17 Jun. 1988. Pp. 414-418. 1988.
19. L. Xiao, S. Boyd, and S. Lall, "A scheme for robust distributed sensor fusion based on average consensus,"

19. *Information Processing in Sensor Networks, 2005. IPSN 2005. Fourth International Symposium on*, vol., pp. 63-70, 15 Apr. 2005.
20. H. Qi, X. Wang, S. S. Iyengar, and K. Chakrabarty, "Multisensor Data Fusion in Distributed Sensor Networks Using Mobile Agents," *Proceedings of 5th International Conference on Information Fusion.* Annapolis, Md., 2005.
21. R. R. Brooks, P. Ramanthan, and A. M. Sayeed, "Distributed Target Classification and Tracking in Sensor Networks," *Signal Processing Magazine, IEEE*, vol. 19, no. 2, pp. 17-29, 2002.
22. A. D'Costa, and A. M. Sayeed, "Data Versus Decision Fusion for Distributed Classification in Sensor Networks," *Military Communications Conference (MILCOM) 2003. IEEE*, vol. 1, pp. 585-590, 2003.
23. T. Clouqueur, P. Ramanthan, K. K. Saluja, and K. Wang, "Value-Fusion versus Decision-Fusion for Fault-tolerance in Collaborative Target Detection in Sensor Networks," *Proceedings of Fourth International Conference on Information Fusion, August,* 2001.
24. A. Makarenko and H. F. Durrant-Whyte, "Decentralized Data Fusion and Control in Active Sensor Networks," *7th Int. Conf on Info. Fusion (Fusion'04).*
25. J. M. Manyika and H. F. Durrant-Whyte, "An Information-theoretic Approach to Management in Decentralized Data Fusion," *Proceedings of SPIE*, vol. 202, 1992.
26. B. Grocholsky, H. F. Durrant-Whyte, and P. Gibbens, "An Information-Theoretic Approach to Decentralized Control of Multiple Autonomous Flight Vehicles," *Proceedings of SPIE*, vol. 4196, pp. 348-359, 2000.
27. J. Zhang, E. C. Kulasekere, and K. Premaratne, "Resource Management of Task Oriented Distributed Sensor Networks," *Circuits and Systems, 2001. ISCAS 2001. The 2001 IEEE International Symposium on*, vol. 3, pp. 513-516, 2001.
28. P. Ögren, E. Fiorelli, and N. E. Leonard, "Cooperative Control of Mobile Sensor Networks Adaptive Gradient Climbing in a Distributed Environment," *Automatic Control, IEEE Transactions on*, vol. 49, no. 8, pp. 1292-1302, 2004.
29. N. Xiong and P. Svensson, "Multi-sensor Management for Information Fusion: Issues and Approaches," *Information Fusion*, vol. 3, no. 2, pp. 163-186, 2002.
30. H. R. Hashemipour, S. Roy, and A. J. Laub, "Decentralized Structures for Parallel Kalman Filtering," *Automatic Control, IEEE Transactions on*, vol. 33, no. 1, pp. 88-94, 1988.
31. L. Y. Pao and N. T. Baltz, "Control of Sensor information in Distributed Multisensor Systems," *American Control Conference*, vol. 4, pp. 2397-2401, 1999.
32. H. Wang, K. Yao, and D. Estrin, "Information-theoretic Approaches for Sensor Selection and Placement in Sensor Networks for Target Localization and Tracking," *Journal of Communications and Networks*, vol. 7, no. 4, pp. 438-449, December 2005.
33. M. Chu, H. Haussecker, and F. Zhao, "Scalable Information-Driven Sensor Querying and Routing for ad hoc Heterogeneous Sensor Networks," *International Journal of High Performance Computing Applications*, vol. 16, no. 3, pp. 293-313, 2002.
34. F. Zhao, J. Shin, and J. Reich, "Information-Driven Dynamic Sensor Collaboration for Tracking Applications," *IEEE Signal Processing Magazine*, vol. 19, no. 2, pp. 61-72, 2002.
35. B. Horling, R. Mailler, M. Sims, and V. Lesser, "Using and Maintaining Organization in a Large-Scale Sensor Network," *Proc. of Workshop on Autonomy, Delegation, and Control,* 2003.
36. C. Intanagonwiwat, R. Govindan, and D. Estrin, "Direction Diffusion: A Scalable and Robust Communication Paradigm for Sensor Networks," *Proceedings of the Association of Computing Machinery (ACM)/IEEE International Conference on Mobile Computing and Networking,* pp. 56-67, 2000.
37. M. Rabbat and R. Nowak, "Distributed Optimization in Sensor Networks," *Proceedings of the third international symposium on Information processing in sensor networks,* pp. 20-27, 2004.
38. A Savkin, R. Evans, and E. Skafidas, "The Problem of Optimal Robust Sensor Scheduling" vol. 1, 3791 Paper number 1250, *CDC*2000.
39. J. M. Nash, "Optimal Allocation of Tracking Resources," *Proceedings of the 1977 IEEE Conference on Decision and Control*, vol. 1, New Orleans, La., Dec. 7-9 1977, pp. 1177-1180.
40. R. Malhotra, "Temporal Considerations in Sensor Management," *Proceedings of the IEEE 1995 National Aerospace and Electronics Conference (NAECON)*, 1995, vol. 1, Dayton, Ohio, May 22-26 1995, pp. 86-93.
41. R. Washburn, A. Chao, D. Castanon, D. Bertsekas, and R. Malhotra, "Stochastic Dynamic Programming for Far-Sighted Sensor Management," *Institute for Robotics and Intelligent Systems (IRIS) National Symposium on Sensor and Data Fusion,* 1997.
42. R. Fung, E. Horvitz, and P. Rothman, "Decision Theoretic Approaches to Sensor Management," DTIC# AB B 172227, Wright-Patterson Air Force Base (AFB), OH, February 1993.
43. J. M. Manyika and H. Durrant-Whyte, "On Sensor Management in Decentralized Data Fusion," *Proceedings of the 31st Conference on Decision and Control*, vol. 4, Tucson, Ariz., Dec. 16-18 1992, pp. 3506-3507.
44. A. Gaskell and P. Probert, "Sensor Models and a Framework for Sensor Management," *Sensor Fusion VI. Proceedings of the SPIE—The International Society for Optical Engineering*, vol. 2059, Boston, Mass., Sep. 7-8 1993, pp. 2-13.
45. J. M. Molina López, F. J. Jiménez Rodríguez, and J. R. Casar Corredera, "Fuzzy Reasoning For Multisensor Management," *IEEE International Conference on Systems, Man, and Cybernetics*, vol. 2, Vancouver, British Columbia, Canada, Oct. 22-25 1995, pp. 1398-1403.
46. K. J. Hintz and E. S. McVey, "Multi-Process Constrained Estimation," *IEEE Transaction on Systems, Man, and Cybernetics*, vol. 21, no. 1, pp. 434-442, January/February 1991.
47. W. Schmaedeke, "Information Based Sensor Management," *Signal Processing, Sensor Fusion, and Target Recognition II. Proceedings of the SPIE—The International Society for Optical Engineering*, vol. 1955, Orlando, Fla., Apr. 12-14 1993, pp. 156-64.
48. K. J. Hintz, "A Measure of the Information Gain Attributable to Cueing," *IEEE Transaction on Systems, Man, and Cybernetics*, vol. 21, no. 2, pp. 237-244, March/April 1991.
49. G. A. McIntyre and K. J. Hintz, "An Information Theoretic Approach to Sensor Scheduling," *Signal Processing, Sensor Fusion, and Target Recognition V. Proceedings of the SPIE—The International Society for Optical Engineering*, vol. 2755, Orlando, Fla., Apr. 8-10, 1996, pp. 304-312.

50. S. Kullback and R. A. Leibler, "On Information and Sufficiency," *The Annals of Mathematical Statistics*, vol. 22, pp. 79-86.
51. W. Schmaedeke and K. Kastella, "Information Based Sensor Management and IMMKF," *Signal and Data Processing of Small Targets* 1998: *Proceedings of the SPIE—The International Society for Optical Engineering*, vol. 3373, Orlando, Fla., April 1998, pp. 390-401.
52. W. Schmaedeke and K. Kastella, "Event-averaged Maximum Likelihood Estimation and Information Based Sensor Management," *Signal Processing, Sensor Fusion, and Target Recognition III. Proceedings of the SPIE—The International Society for Optical Engineering*, vol. 2232, Orlando, Fla., Apr. 4-6 1994, 91-96.
53. K. Kastella, "Discrimination Gain to Optimize Detection and Classification," *IEEE Transactions on Systems, Man, and Cybernetics, Part A: Systems and Humans*, vol. 27, no. 1, pp. 112-116, January 1997. K. Kastella, "Discrimination Gain to Optimize Detection and Classification," *Signal and Data Processing, of Small Targets* 1995: *Proceedings of the SPIE—The International Society for Optical Engineering*, vol. 2561, San Diego, Calif., Jul. 11-13 1995, pp. 66-70.
54. K. Kastella, "Discrimination Gain for Sensor Management in Multitarget Detection and Tracking," *IEEE-SMC and the International Association for Mathematics and Computers in Simulation (IMACS) Multi-conference Computational Engineering in Systems Applications (CESA)* 1996, vol. 1, Lille France, Jul. 9-12 1996, pp. 167-172.
55. K. Kastella and S. Musick, "Comparison of Sensor Management Strategies for Detection and Classification," *9th National Symposium on Sensor Fusion*, Monterey, Calif., March 1996.
56. R. Mahler, "Global Optimal Sensor Allocation," *Proceedings of the Ninth National Symposium on Sensor Fusion*, vol. I (unclassified), Naval Postgraduate School, Nonterey CA, Mar. 12-14, 1996, pp. 347-366.
57. R. P. S. Mahler, "Global Posterior densities for Sensor Management," *Acquisition, Tracking, and Pointing XII. Proceedings of the SPIE—The International Society for Optical Engineering*, vol. 3365, Orlando, Fla., April 1998, pp. 252-263.
58. R. P. S. Mahler, "Multisource, Multitarget Filtering: A Unified Approach," *Signal and Data Processing, of Small Targets* 1998. *Proceedings of the SPIE—The International Society for Optical Engineering*, vol. 3373, Orlando, Fla., April 1998, pp. 296-307.
59. S. Musick, K. Kastella, and R. Mahler, "A Practical Implementation of Joint, Multitarget Probabilities," *Signal Processing, Sensor Fusion, and Target Recognition VII: Proceedings of the SPIE—The International Society for Optical Engineering*, vol. 2232, Orlando, Fla., April 1998, pp. 26-37.

(2) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Centralized—The term "centralized" is generally used to describe a resource allocation system in which the resource allocation decisions are made by a single, centralized planner.

Current System State—The term "current system state" is generally used to refer to the current state of the world with respect to the desired system objective or goal (i.e., desired system state). For example, for an objective function that is based on tracking and classifying all targets in an area of interest, the current system state will be the state of all known targets at the current time, including their estimated tracking position and class (as well as accuracies).

Desired System State—The term "desired system state" is generally used to refer to the desired system objective or goal. For example, a desired system state could be to find all targets with a 10 meter location accuracy and a 99 percent classification accuracy.

Distributed—The term "distributed" is generally used to describe a resource allocation system that includes a plurality of distributed resource managers, where each resource manager independently determines an expected RIG and shares that information with other resource managers so that the distributed resource managers collectively determine which resources should be allocated to a particular task, thereby operating as a distributed planner.

Full Awareness Node (FAN)—The term "full awareness node" or "FAN" generally refers to a sensor node that has complete knowledge of the environment and all other sensor nodes. The FAN is usually used as a central processing node for centralized fusion and tracking architectures.

Gain—The term "gain" as used with the present invention generally refers to a quantifiable measurement of an improved state of the DRAS as it moves from the current system state to the desired system state. For example, if the desired system state is to have a 10 meter track accuracy and the current state is only at a 50 meter track accuracy, then there is mismatch between the current and desired states. If allocating a particular sensor resource is expected to get the location accuracy to 40 meters, then the expected gain of that sensor can be computed. This is a quantitative computation based on the current 50 meter track accuracy and the expected 40 meter track accuracy (described below as the kinematic gain). Classification and overall gains can be similarly computed.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Rate of Information Gain (RIG)—The term "RIG" is defined as the rate at which information is gained and is simply the ratio of gain and the cost (usually the total time) it would take to achieve that gain.

Resource—The term "resource" as used with respect to this invention generally indicates an allocatable and usable resource that is operable for performing an assigned task and moving a system from a current system state to a desired system state. A non-limiting example of such a resource includes a sensor that is configured to observe the current system state and generate signals reflective of the current system state. Other non-limiting examples include a machine, a computer, a human, etc.

Resource Manager—The term "resource manager" as used with respect to this invention generally indicates a system or subsystem that is operable for managing a resource by receiving a desired system state and a current system state and, based on its resource capabilities and the current system state and desired system state, determine the expected RIG if used to move the current system state toward the desired system state and, with other resource managers, collectively determine which resource to allocate to move the current system state toward the desired system state.

(3) Principal Aspects

The present invention has three "principal" aspects. The first is a Distributed Resource (e.g., sensor) Allocation System (DRAS). The DRAS is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 2:
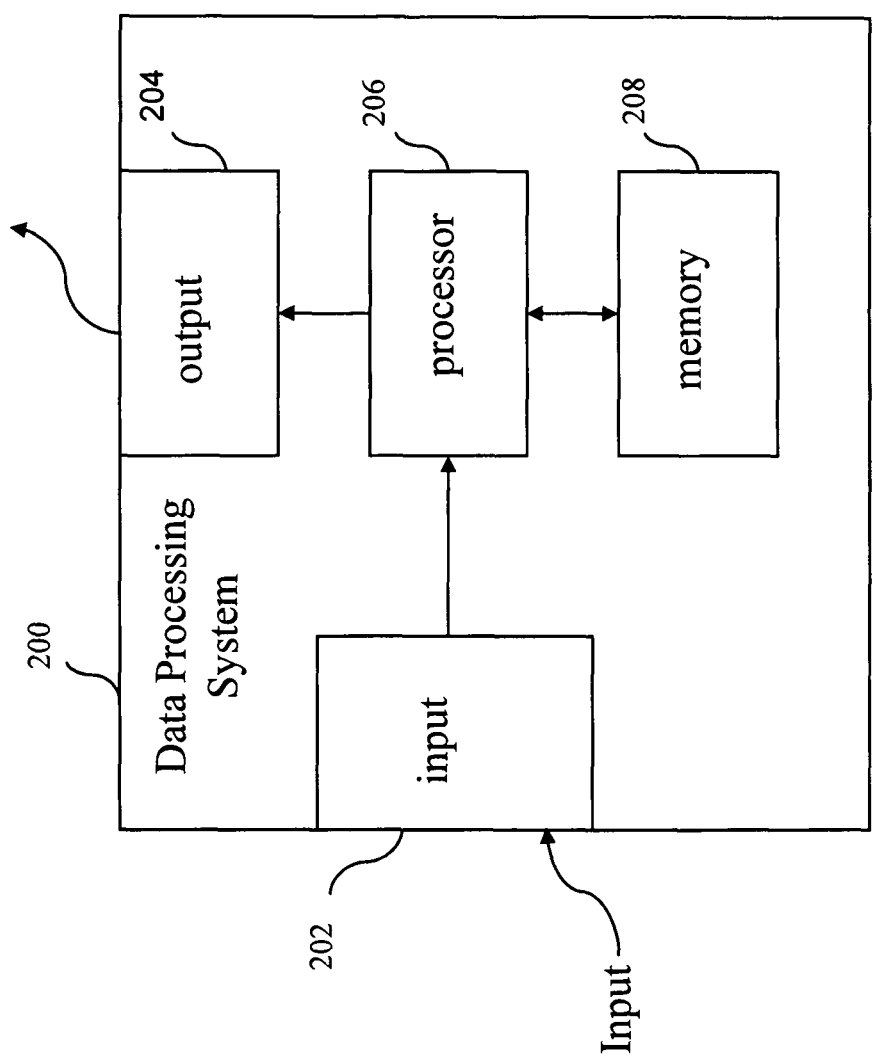
FIG. 2 is a block diagram illustrating components of a resource allocation system according to the present invention.

A block diagram depicting components of the DRAS of the present invention is provided in FIG. 2. The DRAS 200 comprises an input 202 for receiving information from at least one sensor. Note that the input 202 may include multiple input ports, allowing for the input of multiple streams (or types) of data. Typically, input is received from at least one sensor, non-limiting examples of which include video image sensors and still image sensors (such as cameras). An output 204 is connected with the processor for providing information to other systems in order that a network of computer systems may serve as a DRAS. Output may also be provided to other devices or other programs; e.g., to other software modules, for use therein. The input 202 and the output 204 are both coupled with a processor 206, which may be a general-purpose computer processor or a specialized processor designed specifically for use with the present invention. The processor 206 is coupled with a memory 208 to permit storage of data and software that are to be manipulated by commands to the processor 206.

Figure 3:
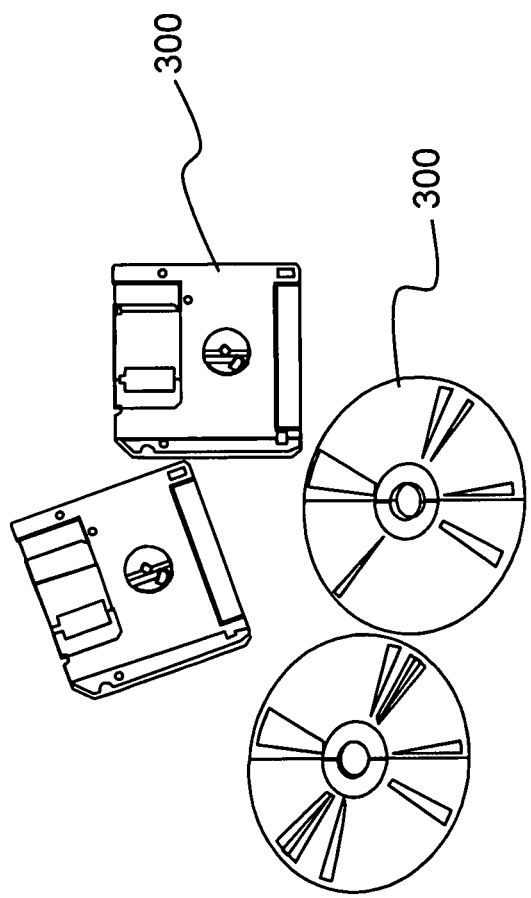
FIG. 3 is a computer program product according to the present invention.

An illustrative diagram of a computer program product embodying the present invention is depicted in FIG. 3. The computer program product 300 is depicted as an optical disk such as a CD or DVD. However, as mentioned previously, the computer program product generally represents computer-readable instructions stored on any compatible computer-readable medium.

(4) Introduction

The present invention is a Distributed Resource (e.g., sensor) Allocation System (DRAS). The DRAS provides an approach for both short-term and long-term, closed-loop distributed resource control and planning (i.e., optimized resource allocation, scheduling and tasking to best meet user requirements). It should be noted that the present invention can be applied to a wide variety of resources, a non-limiting example of which includes sensors. For simplicity, the present invention is described with respect to a sensor allocation system. However, the invention is not intended to be limited thereto as it can be applied to a variety of resources. In general, this invention can be extended and applied to any system that makes decisions based on collected information to control resources.

The present invention improves upon traditional resource allocation systems by: (1) including an information-theoretic framework in which system performance goals (e.g., tracking, classification, search, etc.), current performance state, and sensor models used to achieve the performance goals can all be specified in a quantitative way; (2) using this same framework to prioritize actions (e.g., sensing tasks) based on fully distributed planning/scheduling of actions; (3) performing these tasks in a distributed fashion; and (4) incorporating all of the above into a single system.

As can be appreciated by one skilled in the art, the present invention has multiple applications. For example, surveillance and tracking can be varied and complex. In this application, critical decision-making at various levels is usually done by human operators. At all levels, the operator must potentially evaluate a large number of possible options in a short period time. Thus, the operator may be overwhelmed by the analysis. This can result in inefficient utilization of resources and poor system performance. The present invention provides an automated approach to replace or assist the operator in the decision making process. While such decision aids are available in various forms, the present invention simplifies the process by provide a system that quantifies the complete situation and disparate goals (such as search, track, classify, etc.) in a single common metric and controls the resources to achieve them (closed-loop control) with a computationally tractable, long-term planning approach. In other words, the present invention assesses a current state and a desired state and allocates resources to best achieve the desired state.

(5) Specific Aspects of the Invention

As a DRAS, the present invention includes a plurality of resources, with each resource having a resource manager (e.g., sensor resource manager). Or stated in the alternative, the present invention includes a plurality of resource managers, each assigned to manage a resource. Thus, each resource manager has an operational knowledge of its own resource capabilities. The resource managers are configured to schedule the resources to collectively provide an optimized resource allocation. For a thorough understanding of the present invention, the following description will be separated into a resource management section, an architecture section, a centralized planner section, a distributed planner section, and an experimental results section providing experimental results using the present invention.

(5.1) Resource Management

Resource management (RM) is used to monitor and manage a plurality of resource. As a non-limiting example, RM will be described herein as sensor resource management (SRM). In an SRM problem, a network of sensors observes a set of tracks; each sensor can be set to operate in one of several modes and/or viewing geometries. Each mode incurs a different cost and provides different information about the tracks. Each track has a kinematic state (that tracks, for example, position and velocity in two dimensions) and a discrete type; the sensors can observe either or both of these, depending on their mode of operation. The goal in the SRM problem (or any RM problem) is to gain as much information as possible while incurring as little cost as possible. Although these goals appear contradictory, they can be accomplished by maximizing the average rate of information gain (i.e., total information gain divided by total cost; usually cost is the time taken to achieve that gain). Details of such a process are provided below.

(5.1.1) Problem Specification

A traditional SRM problem consists of a set of S sensors, each of which has some number of actions/capabilities (e.g., mode/geometry combinations) available to it, and a set of N tracks, each of which has an initial probability distribution over the C identification types and the K-dimensional kinematic states, as described in further detail below.

(5.1.1.1) Track State (Kinematic)

In the examples considered, the kinematic state of each track is modeled by a linear dynamical system and tracked with a filter (such as a Kalman filter); however, it could be modeled by any generative model whose state can be estimated from observational data. The dynamics of the linear dynamical system are governed by the following equations:

$$X_t = \Phi X_{t-1} + w_t, \text{ and} \tag{1}$$

$$w_t \sim N(0, Q). \tag{2}$$

Here, $X_t$ is the state of one of the tracks at time t (if it is necessary to refer to the state of a particular track, i, a superscript will be added: $X_t^i$; the tracks are independent of each other). Like all vectors presented herein, $X_t$ is a column vector. $\Phi$ and Q are matrices composed of parameters of the DRAS, and $N(m, \Sigma)$ denotes the multivariate normal distribution with mean vector m and covariance matrix $\Sigma$. $w_t$ denotes the additive process noise component at time t, and the ~ denotes equivalents.

If the track is observable at time t by sensor j (which depends on the state of the track and the action selected for the sensor), then a kinematic observation ($z_{t,j}$) will be generated according to the following:

$$z_{t,j} = H_{t,j} X_t + v_{t,j}, \text{ and} \tag{3}$$

$$v_{t,j} \sim N(0, R_{t,j}). \tag{4}$$

Here, determines what is measured by the sensor and $R_{t,j}$ is a measure of the accuracy of the measurement. $Z_t$ is the set of all the kinematic observations of a track at time t. $v_{t,j}$ denotes the measurement noise at time t for sensor j.

Since X, is unobservable, it must be estimated through the use of a Kalman filter (see literature reference no. 13). The Kalman filter maintains a least-squares estimate $x(t|t) = E[X_t | Z_1, \ldots, Z_t]$ and a covariance matrix $P(t|t) = E[x(t|t) x^T(t|t) | Z_1, \ldots, Z_1]$ of the error. This is recursively maintained through the following sets of equations:

$$x(t|t-1) = \Phi x(t-1|t-1), \tag{5}$$

$$P(t|t-1) = \Phi P(t-1|t-1)\Phi^T + Q, \tag{6}$$

$$P^{-1}(t|t) = P^{-1}(t|t-1) + \sum_{j=1}^{S} \chi_{t,j} H_{t,j}^T R_{t,j}^{-1} H_{t,j}, \text{ and} \tag{7}$$

$$x(t|t) = P(t|t)\left(P^{-1}(t|t-1)x(t|t-1) + \sum_{j=1}^{S} \chi_{t,j} H_{t,j}^T R_{t,j}^{-1} z_{t,j}\right). \tag{8}$$

where $\chi_{t,j}$ is an indicator variable that is 1 when sensor j produces a kinematic observation of the track at time t and 0 otherwise.

(5.1.1.2) Track State (Identification)

As with the kinematic state, the identification of the track can be reasoned about in a number of ways. As a non-limiting example, Bayesian reasoning can be applied to the problem. The sensors are modeled using confusion matrices; the $kl_{th}$ element of $\Theta_{t,j}$ gives the probability at time t that sensor j reports the track as type k when it is type l. The uncertainty is modeled as a multinomial distribution; the $k_{th}$ element of the belief state b(t) is the belief (i.e., probability) at time t that the track is type k, given all the observations that have come up to (and including) time t. If the track is observable at time t by sensor j, then an identification observation ($o_{t,j}$) will be produced. $O_t$ is denoted as the set of all the identification observations of a track at time t.

$\Theta(o,t,j)$ denotes the diagonal matrix whose $k_{th}$ element is the probability that sensor j would produce observation o at time t given that the track is of type k (i.e., the diagonal of this matrix is the oth row of $\Theta_{t,j}$). Then, the belief state can be updated with the following equation:

$$b(t+1) = \left(\prod_{j=1}^{S} \Theta(o, t, j)^{\kappa_{t,j}}\right) \frac{b(t)}{\Gamma}, \tag{9}$$

where $\kappa_{t,j}$ is an indicator variable that is 1 when sensor j produces an identification observation of the track at time t and 0 otherwise, and $\Gamma$ is a normalizing constant (the elements of b(t+1) must add to 1).

(5.1.1.3) Information Measure

The information measure is used to judge how much information is gained when transitioning from one state to another. To do this, the information gained is measured about the (discrete) type as well as the (continuous) kinematic state, with the type and kinematic state then being weighed against each other. Shannon entropy can be used to measure information gained about the type, according to the following:

$$h_S(b(t)) = -\sum_{k=1}^{C} b_k(t) \lg b_k(t), \tag{10}$$

where lg denotes Log, $h_s$ denotes shannon entropy, and b denotes the belief (i.e., probability), such as that at time t that the track is type k.

The identification information gain is then $h_S(b(t)) - h_S(b(t+1))$. Similarly, the entropy in the kinematic state can be measured by the differential entropy ($h_d$) of a normal distribution, according to the following:

$$h_D(P(t|t)) = -\frac{1}{2} \ln((2\pi e)^\kappa \det(P(t|t))). \tag{11}$$

Here, det(P) is the determinant of P; recall also that K is the dimension of the kinematic state of a track. As before, the kinematic information gain is given by $h_D(P(t|t)) - h_D(P(t+1|t+1))$.

In both the discrete case and the continuous case, it can be shown that the combined entropy of multiple tracks' state estimates is the sum of their individual entropies (assuming that the estimates for each track are independent of each other). In order to get an overall measure of information gain, the information gains, kinematic and identification, of all the tracks, are combined as follows:

$$\Delta h(t) = \sum_{i=1}^{N} (h_S(b^i(t)) - h_S(b^i(t+1))) + \quad (12)$$

$$\alpha \sum_{i=1}^{N} (h_D(P^i(t|t)) - h_D(P^i(t+1|t+1))).$$

The parameter a can be used to trade off the importance of kinematic information gain and identification information gain. α is in the range of 0 to 1. Thus, the user can trade importance of kinematic entropy by changing α. For α=1, the kinematic entropy is used as is. In the experimental results described below, α=1.

Each action (i.e., assignment of modes and viewing geometries to settings) has a deterministic cost that is known a priori; the cost at time t is written as $c_t$. Thus, the rate of information gain (RIG) at time t is calculated according to the following:

$$RIG(t) = \frac{\Delta h(t)}{c_t}. \quad (13)$$

(5.2) Architectures for Resource (Sensor) Management

There are several options available with regard to an overall network architecture. There are two types of nodes in a network: sources, which supply new information, and sinks, which collect information and process it. In centralized architectures, sensors primarily function as sources, while full-awareness nodes (FANs) act as sinks. As the system moves toward distributing the workload, more and more of the FAN functionality is off-loaded to the individual sensors. For fully-distributed architectures, no FANs are used. Thus, each sensor is equally a source and a sink.

All of the architectures described herein utilize centralized fusion. Because the architectures share centralized fusion, the following description will focus on the difference between a centralized and a distributed management.

(5.2.1) Centralized Resource Management with Centralized Fusion

Figure 4:
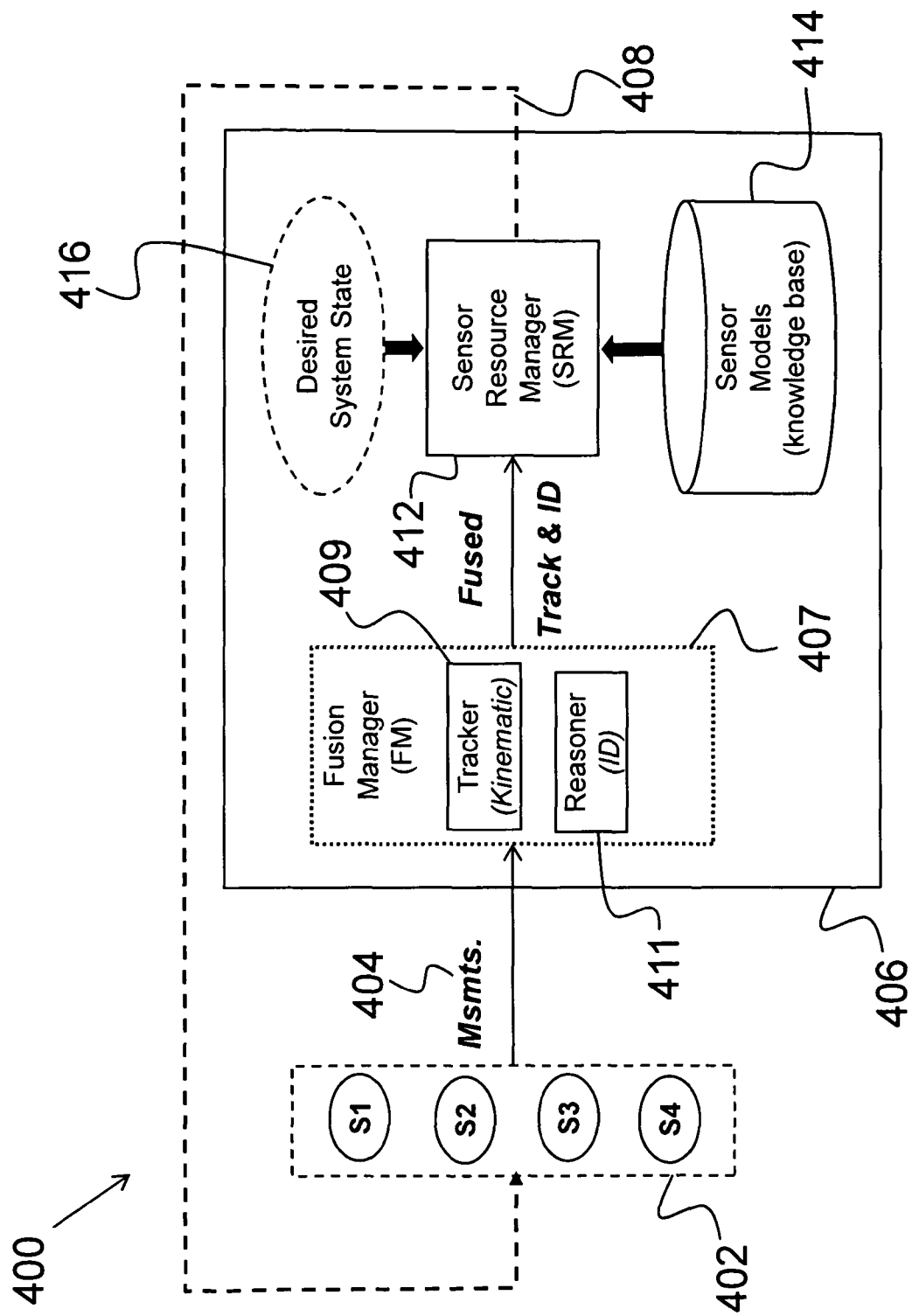
FIG. 4 is a block diagram of a fully-centralized sensor network.

FIG. 4 illustrates an example of a fully-centralized sensor network 400. In this example, the sensors 402 are completely "dumb," meaning that their sole task is the produce measurements 404 and transmit the measurements to a FAN 406. The FAN 406 processes the measurements received from each sensor, refines the current state with those measurements, and then determines the best course of action. In doing so, the FAN 406 utilizes a fusion manager 407.

The fusion manager 407 is a module that utilizes a tracker module 409 and a reasoner module 411. The tracker module 409 is configured to track objects present in a scene using any suitable tracking system, a non-limiting example of which includes a Kalman filter (e.g., See section 5.1.1.1). Additionally, the reasoner module 411 is configured to identify objects present in the scene. The reasoned module 411 identifies objects in the scene using any suitable identifier, a non-limiting example of which includes a Bayesian reasoning engine (e.g., See section 5.2.2.2). Once the object is identified and tracked, the fusion manager 407 fuses this information (as a fused track and identification (ID)) for use by the Sensor Resource Manager 412. The Resource Manager 412 then compares the fused track and ID against a known knowledge base 414 and the desired system state 416. Based on the fused track and ID and the knowledge base 414, the Resource Manager 412 then generates commands 408. The commands 408 are sensor plans to cause the sensors 402 to operate in manner that will provide results most similar to the desired system state 416. The commands 408 are then relayed to the sensors 402, and the process repeats itself.

This method is guaranteed to produce the best results given any set of measurements among all of the available architectures. However, since all of the functionality is handled by a single node, it is vulnerable to catastrophic failure. It also suffers from computational burdens, as detailed in section 5.5 below.

(5.2.2) Distributed Resource Management with Centralized Fusion

Figure 5A:
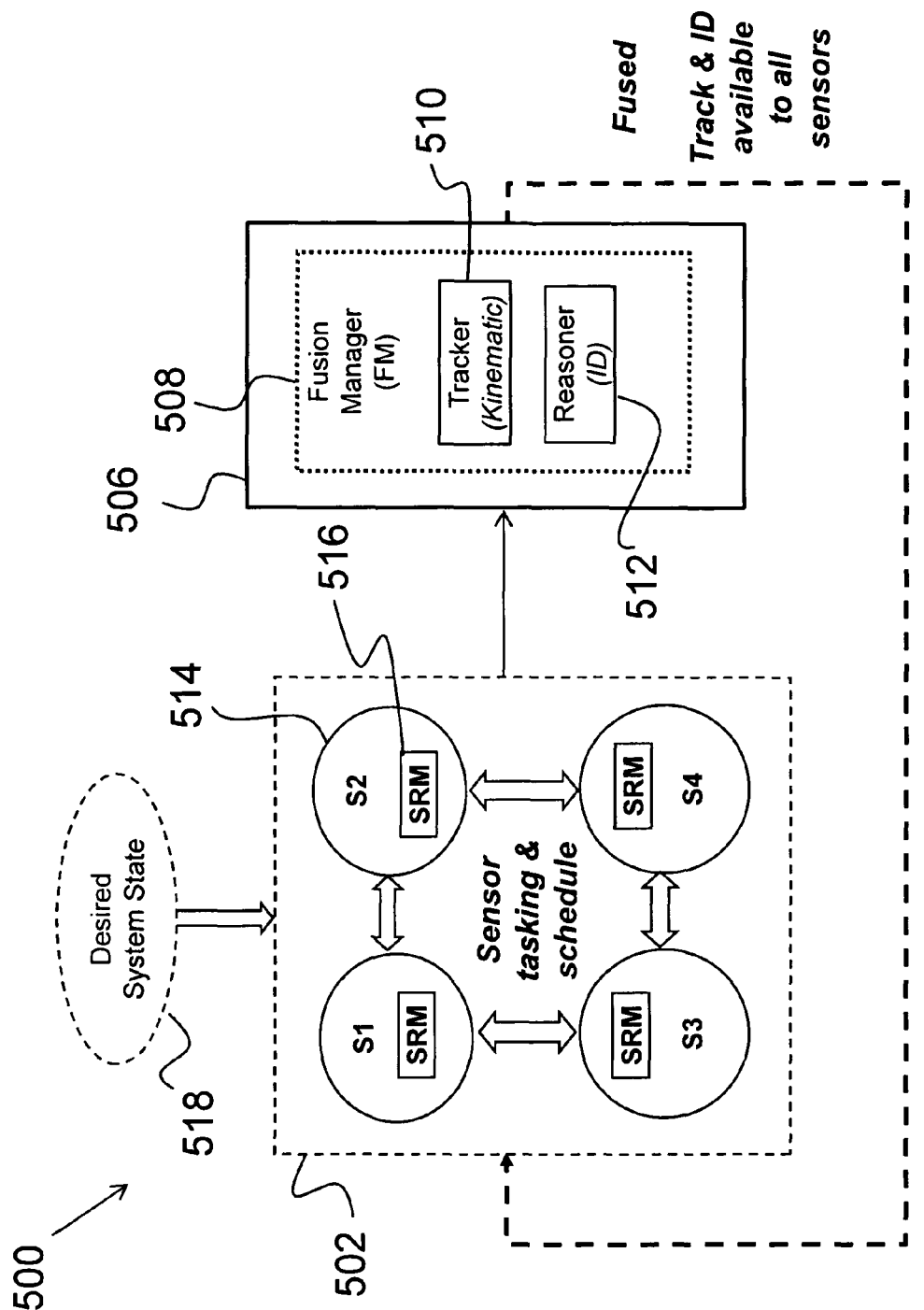
FIG. 5A is an illustration of a resource allocation system according to the present invention.

FIG. 5A is an illustration of a resource allocation system 500 according to the present invention. As shown, the system 500 uses distributed resource management with centralized fusion. In this architecture, the sensors 502 are responsible for determining their next actions, while measurements 504 are still fused together by a FAN 506 (as described above), which computes an updated system state. In this case, the FAN 506 includes a lone fusion manager 508 without a resource manager. As was the case above, the fusion manager 508 includes a tracker module 510 and a reasoner module 512 to fuse tracking and identification information (which operates as the current system state) that is available to all of the sensors 502. However, in this case, each individual sensor 514 includes its own Sensor Resource Manager 516 to compare the desired system state 518 against the updated (current) system state and alters its own sensor response accordingly.

This has computational benefits over a completely centralized architecture. In centralized resource management, the full-awareness node (FAN) has to consider the joint-action space of all sensors at each decision point. Since this action space grows as nodes $(N)^2$, this process becomes computationally impossible for large N. In distributed resource management, sensors can utilize a myriad of decision schema when determining the best course of action. For example, the system can use a voting mechanism or otherwise decide by computing a difference between a current system state and a desired system state and operate to move the system from the current system state to the desired system state.

Figure 5B:
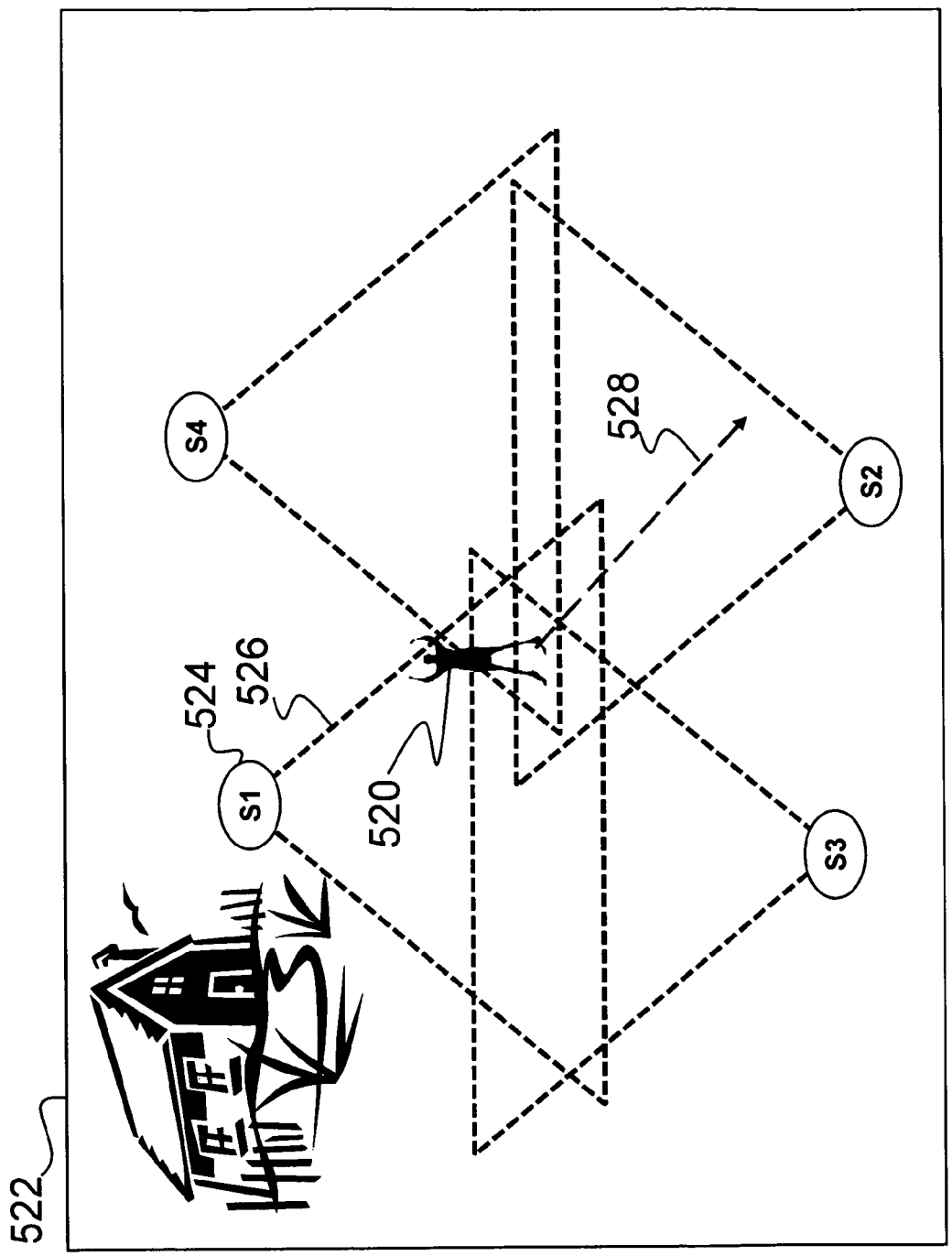
FIG. 5B is an illustration of a scene depicting an object being tracked by resources as the object passes through the scene.

FIG. 5B provides a non-limiting example of a resource allocation system and its operational environment. In this example, the fusion manager is configured to track identified an object 520 in the scene 522 across multiple sensors (i.e., S1, S2, S3, and S4). For example, each sensor 524 includes a sensing range 526 and the fusion manager is configured to track the identified object 520 in the scene 522 across the multiple sensors. As the object travels from the sensing range 526 of a first sensor S1 and into the sensing range 526 of a second sensor S2, the fusion manager coordinates the identification of the object 420 from the first sensor S1 to the second sensor S2 to provide an updated current system state that reflects motion 528 of the identified object 520 from the first sensor S1 to the second sensor S2. A desired system state in this case may be to maintain the object 520 in the sensing range 526 of the sensors for the longest amount of time, given the object's 520 current motion 528. Thus, the sensor with the highest expected RIG would be the sensor (i.e., S2) with a sensing range 526 that encompasses the largest portion of the motion 528 and its vector. As such, the sensor (i.e., S2) is designated as an allocated resource and is allocated to track the object 520 in the scene 522 to move the updated current system state toward the desired system state. The system is constantly updated by checking the motion 528 of the object 520 against the sensors and the sensing ranges 526.

(5.3) Centralized Planners

Described below are two potential centralized planning methods. To have an appreciation of the advantages of a distributed planner according to the present invention, it is beneficial to have an understanding of the centralized planners listed below.

Centralized Short-Term Planner (CSTP)

One simple and often effective planning algorithm that emerges from the goal statement given above (i.e., "maximize the average rate of information gain") is a centralized short-term planner that maximizes instantaneous expected information gain. In such a planner, there is a single machine or agent that evaluates each assignment of actions to sensors (such an assignment is called a joint action) by computing the expected rate of identification information gain and kinematic information gain for each track given the joint action. The agent then picks the assignment that gives the highest expected rate of information gain. Based on this assignment, the sensors execute the assigned actions and the overall state of the system is updated. The process is then repeated.

Centralized Long-Term Planners (CLTP)

The above planner addresses short-term planning, i.e., sensor tasking to maximize desired performance goals over a short look-ahead horizon (see literature reference no. 12). Thus, it is greedy or myopic as it aims at optimizing immediate future performance. In many cases, such myopic planning can lead to sub-optimal performance over the long term. For example, if a certain target will be obscured in the near-future, taking that into consideration during sensor tasking may result in overall better sensor tasking policy and tracking accuracy. The centralized long-term planner will again have a single machine or agent that will evaluate benefit of actions for all sensors across multiple time steps in the future and use that to decide which assignment of sensors to actions is most appropriate.

Both of the above planners are centralized in that there is a single machine or agent doing all the computations for determining optimal short or long-term sensor-action assignment. In addition, they assume a single decision-maker that is privy to all of the information in the sensor network. This makes the system susceptible to faults and complete failure if the single decision-maker is disabled for any reason. In addition, the computational complexity of centralized planners is high.

Distributed planning algorithms may provide many benefits. They require less communication overhead and are more resilient to the failure of a sensor in the network. Described below are two distributed planning algorithms.

(5.4) Distributed Planners

(5.4.1) Distributed Short-Term Planner (DSTP)

In a Distributed Short-Term Planner (DSTP), the joint action is chosen over the course of S rounds. Before the first round, each sensor is marked "undecided" or "unallocated." In each round, the undecided/unallocated sensors compute the expected rate of information gain for each of its actions, combined with the actions of the decided/allocated sensors, given the current state estimate and ignoring the effects of the other undecided/unallocated sensors. Please note that the terms "undecided" and "unallocated" are used interchangeably herein and are intended to refer to a resource (e.g., sensor) that is unallocated or otherwise not assigned to a particular task. Alternatively, the terms "decided" and "allocated" are also used interchangeably herein and are intended to refer to a resource that has been allocated to a particular task.

Each sensor communicates the value of its best action to the other undecided sensors; the sensor with the highest value is marked as decided and must then communicate information about its selected action to the undecided sensors before the next round may start. This is a direct implementation of the distributed resource management with centralized fusion architecture, as described in section 5.2.2. Such a process can be more efficient than the centralized short-term planner, even before considering the gain from parallelizing the computation.

Example pseudo-code for a distributed short-term planner (state) is provided below. The input is the initial state (state), while the output is an assignment of an action to each sensor action. The sample pseudo-code is as follows:

```
let undecided=nil
for each sensor s
    let undecided=undecided ∪ {s}
    let action[s]=nil
while |undecided|>0
    for each s in undecided
        for each a in get_available_actions(s, state, action)
            let action[s]=a
            let g[s, a]=expected_rate_of_information_gain(state, action)
```

In the above example, U denotes a union operator and the while operator does not have an "end" line. Additionally, the function get_available_actions(s, state, action) returns a set of actions available for sensor s from the state state and given the assignments of action. Additionally, the rate of information gain is the expected gain divided by the cost (usually cost equals time) it would take to get that gain (e.g., as in using a sensor mode that gives you X units of gain but takes Y units of time; thus rate of gain will be X/Y). In the present invention, the expected gain is computed for all actions when the tree is built. The rate of information gain is usually only computed after a path through the tree has been considered and then all expected gains of all actions of that tree are summed and divided by total time it would take for all those actions.

Figure 5C:
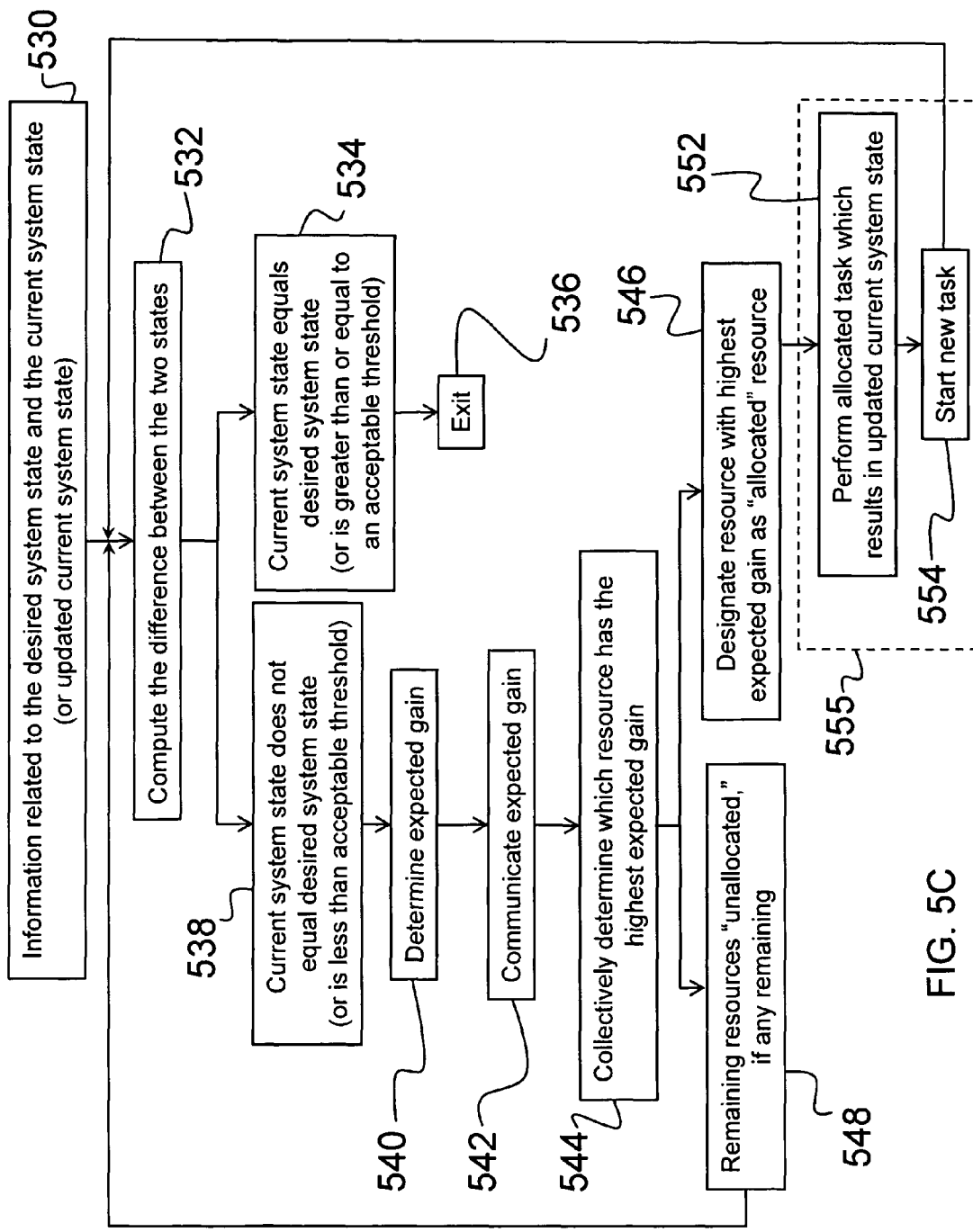
FIG. 5C is a schematic illustrating a process for allocating resources according to the present invention.

Thus, the present invention includes a plurality of resources (e.g., sensors), with each resource having a resource manager. Each resource manager possesses knowledge of its own resource capabilities (i.e., the resource's ability to move the system from the current system state to the desired system state). As shown in FIG. 5C, upon receiving information 530 related to the desired system state and the current system state, each resource manager computes 532 the difference between the two states.

If the current system state has reached 534 the desired system state (or an acceptable threshold), then the system exits 536 (or accepts the next desired system state). Alternatively, if the current system state has not reached 538 the desired system state (or is less than an acceptable threshold), then each resource manager independently determines 540 the expected RIG if the corresponding resource is used to move the current system state toward the desired system state. It should be noted that due to computer limitations, it may be possible in some cases that the current system state can never equal the desired system state. In such cases, the desired system state is adjusted to compensate for the computer limitations. As stated in another form, the current system state can be compared to the desired system state to determine a difference between the two. If the difference is less than or equal to an acceptable, predetermined threshold, then end processing (exiting). Alternatively, if the difference between the current system state and the desired system state is greater than a predetermined threshold, then continue processing.

The expected RIG is then communicated 542 to other resource managers. The resource managers then review the expected RIG s and collectively determine 544 which resource has the highest expected RIG in moving the current system state to the desired system state. Thereafter, the resource that provides the highest expected RIG is then designated 546 as an allocated resource and is allocated to move the current system state toward the desired system state. The remaining resources are then designated 548 as unallocated resources having unallocated resource managers. Each resource manager then computes an expected modified current system state due to the expected gain of the allocated resource. The unallocated resource managers repeat the acts listed above until the plurality of resources have been allocated. Each allocated resource is further configured to perform 552 its allocated task, which results in an updated current system state (or an expected updated system state). Each allocated task can then be placed in a queue. Finally, upon completion of its allocated task, each corresponding resource manager is configured to repeat the acts outlined above to start 554 on another task. It should be noted that in some cases, it may be desirable to operate the system such that all allocated tasks are performed simultaneously 555 after all resources are "allocated." Thus, performing 552 and completing the allocated task is delayed until all resources are allocated.

Figure 5D:
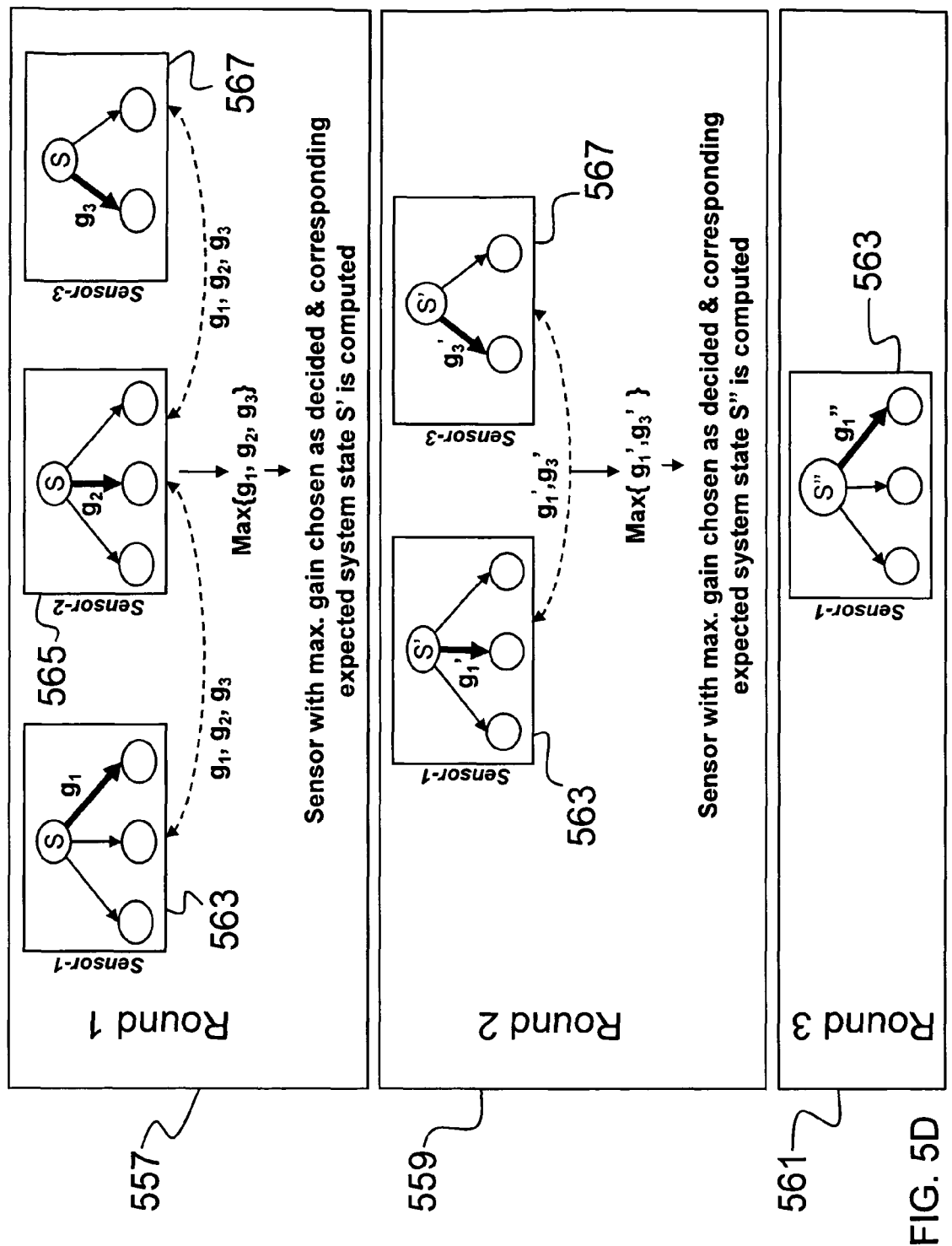
FIG. 5D is a schematic illustrating an example of a distributed short-term planner according to the present invention.

For further illustration, FIG. 5D is a flowchart illustrating an example of a DSTP according to the present invention. The non-limiting example provided in FIG. 5D includes three rounds (i.e., round one 557, round two 559, and round three 561) with three resources (i.e., sensor one 563, sensor two 565, and sensor three 567).

Round one 557 includes three main acts.
1. First, all three sensors are undecided (unallocated). S represents the current system state, which is the same for all sensors. Each sensor the computes a new system state based on each possible action and corresponding gains. The number of possible actions may be different, depending on sensor type, modes, etc. Suppose that $g_i$ is the maximum rate of information gain for sensor i.
2. Each sensor then communicates its maximum RIG to all other sensors. Each sensor runs a maximum computation operator and finds the value that provides the greatest maximum RIG. For example, suppose $g_2$ is the maximum RIG that is generated between the sensors.
3. Sensor two 565 is then allocated. A new expected system state S' is then computed based on the allocated sensor's (sensor two 565) action.

In round two 559, sensor one 563 and sensor three 567 are undecided (unallocated). The two sensors 563 and 567 start with S' state and carry out act one (as listed above). The new maximum RIG and corresponding action may be different at this point since the initial system state is S' (as opposed to S). Acts two and three above are then repeated, resulting in $g_3'$ as being the maximum RIG with sensor three 567 then being decided (allocated). A new system state S" is then computed.

In round three 561, only sensor one 563 is undecided (unallocated). The sensor starts with system state S" and performs act one as listed above. The action with the maximum RIG is then chosen as this sensor's action. Sensor one 563 is now also allocated, which results in all sensors being allocated.

This planner is myopic in that it does not consider future actions. The lack of consideration for future actions is addressed by the long-term distributed planner described below.

(5.4.2) Distributed Long-Term Planner (DLTP)

In the Distributed Long-Term Planner (DLTP) system, each resource manager computes its expected rate of information gain for each of its actions (using the resource (e.g., sensor) corresponding to the resource manager) over one time step without any consideration for other sensors. Using the expected states from each of its actions, the DLTP further computes the next expected state and repeats the process until a fixed number of time steps have been completed. Thus, the DLTP generates an action tree (i.e., possible allocation tree) and corresponding expected states at the end of each action. The system then computes the best action sequence as the one giving the highest rate of information gain. All sensors do the same computation independently. Further, each sensor applies the planning algorithm as if it were the only sensor; each sensor's value estimate is sent to the other sensors. The sensor whose value is highest is marked as "decided." The decided sensor communicates information about its selected action to the undecided sensors. The undecided sensors actions are then selected by the DSTP. Thus, the DLTP system combines one round of long-term planning followed by one or more rounds of short-term planning. That is, the first round of the DSTP is replaced by a non-myopic, long-term planning round (illustrated as FIG. 5E below). Although the long-term planning round is more computationally complex than the first round of the DSTP, the two planners have the same communication requirements. In the testing and validation of DLTP, it was found that incorporating the first round of long-term planning to the DSTP gave significant improvements over a pure-DSTP approach. It should also be noted that there are many available combinations of long-term and short-term planning that can be implemented to provide the best possible solution given available computational resources and computation time. For example, if long-term planning takes ten seconds and short-term planning takes one second, and if there are a total of fifteen seconds available, then one long-term planning round can be implemented with five short-term planning rounds. However, if there are twenty five seconds available, one can understand that other combinations of long-term planning and short-term planning are possible.

Figure 5E:
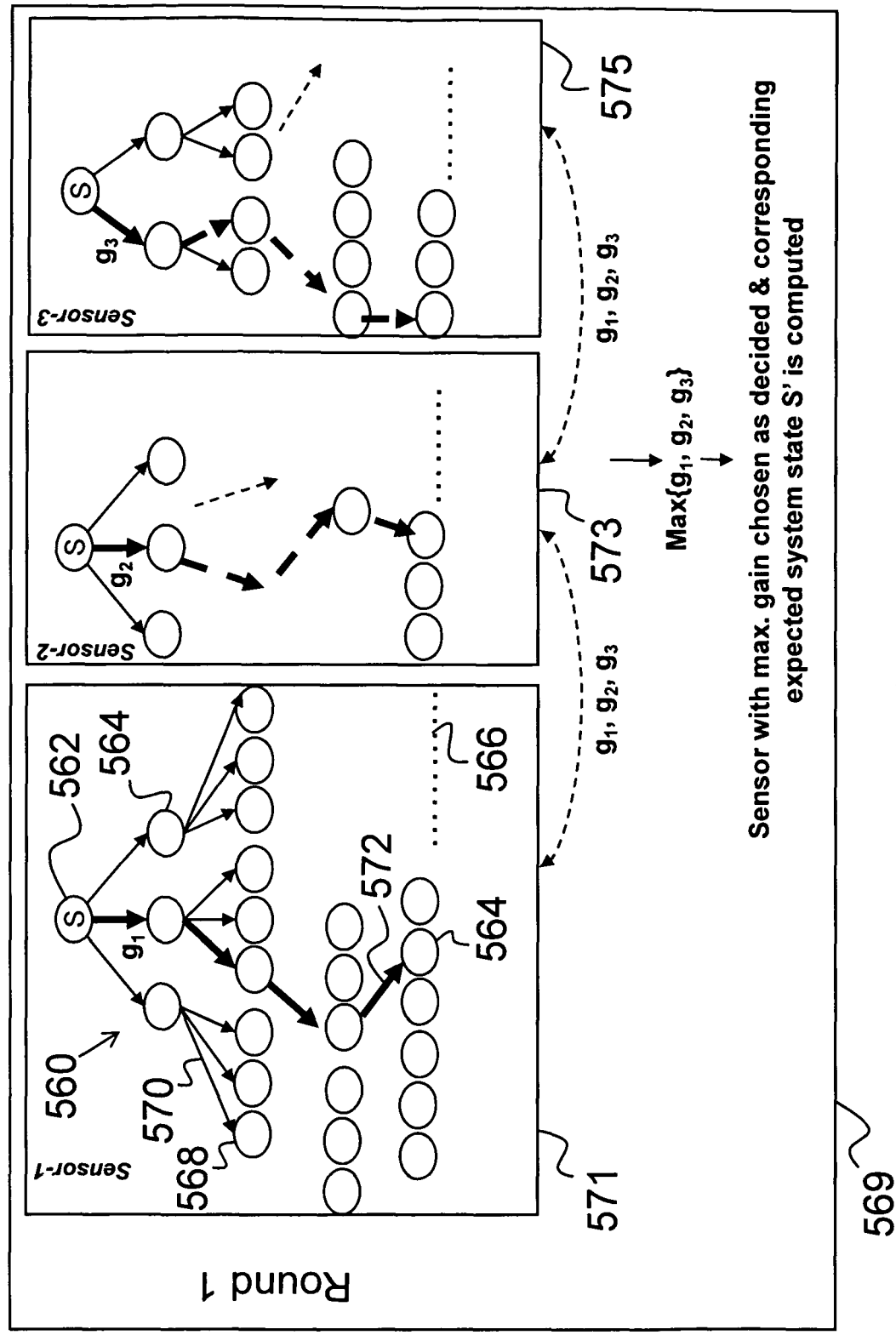
FIG. 5E is a schematic illustrating an example of a distributed long-term planner according to the present invention.

For further illustration, FIG. 5E depicts a flowchart illustrating an example of a DLTP according to the present invention. The non-limiting example provided in FIG. 5E depicts a first round (i.e., round one 569) with three resources (i.e., sensor one 571, sensor two 573, and sensor three 575).

As mentioned above, in determining its expected RIG, each resource manager is configured to generate a possible allocation tree 560. The possible allocation tree 560 includes a base 562 representing a current system state and a plurality of step-wise nodes 564. Each node 564 represents an expected modified current system state based on the possible allocation of the resource (corresponding to the resource manager) to a task and providing a possible expected gain for allocation of the resource to the task. The possible allocation tree 560 is generated until a predetermined fixed horizon of planning 566. Each node 564 at the horizon of planning 566 represents an expected final system state after "L" look-ahead steps. After generating the possible allocation tree 560, each resource manager is further configured to compute a total possible expected RIG for each path from each node 564 at the horizon of planning 566 to the base 562. The total possible expected RIG s for each path is ordered, which allows the resource managers to determine the paths with the highest total possible expected RIG s. Thus, the resource managers use the path with the highest total possible expected RIG as the expected RIG s that are to be communicated to other resource managers.

In other words, in round one 569, all sensors (i.e., sensor one 571, sensor two 573, and sensor three 575) are undecided/unallocated. S represents the current system state (at the base 562) which is the same for all sensors. Each sensor computes a new state (i.e., expected modified current system state) 568 based on each possible action 570. These states are then continued forward based on next possible actions until the possible allocation tree 560 (as shown) is built (i.e., until a predetermined fixed horizon of planning 566). The best path 572 through the possible tree 560 is then computed. The best path 572 is illustrated with dark arrows and this path's RIG for sensor i is denoted as $g_i$.

Each sensor then communicates its maximum expected RIG to all other sensors. Each sensor then runs a maximum computation operator and finds the maximum value. For example, suppose $g_2$ is designated as the path that provides the maximum expected RIG. Sensor two 573 would then be decided/allocated. The corresponding expected system state S' is then calculated based on the action of the allocated sensor (i.e., sensor two 573). In each of rounds two and three, the procedure above is repeated and only based on a one-step look-ahead.

A potential issue with this approach is the uncertainty of the future state. Long-term strategies already suffer from unforeseen events such as the discovery of a new track, the loss of a known track, or drastic changes in the environment. In a perfect world, the parameters would remain unchanged, and the best possible action that is predicted for $t_1$ at $t_0$ would be identical to the action predicted for $t_1$ at $t_1$. However, due to the often dynamic nature of the problem, this is rarely the case. Thus, it is expected that planners with less-than-perfect scenario prediction qualities will perform weakly in highly dynamic environments. To address this issue, each iteration of the DLTP system reassesses the current state before reassigning the resources (e.g., sensors) to a particular task.

(6) Experimental Results

The experimental setup for a distributed system is more involved than if comparing only centralized algorithms. If the experimental setup involved only centralized algorithms, it could be performed using two simple test environments which can be referred to as "all visible" and "blind spot." In both environments, each object (track) has a four-dimensional kinematic state (comprising the position and velocity of the track along two dimensions in space). In addition, each track can be one of three classes, with a uniform prior distribution over these types. Sensors in both environments pick a track to observe at each decision point, and each sensor picks one of several modes available to it. In the "all visible" environment, all tracks are visible at all times, while the "blind spot" has one or more of the tracks pass through an area where they are not visible to any of the sensors.

The difficulty in using this same setup when comparing the centralized and distributed algorithms is that the performance differences are subtle in simple environments. To better highlight the difference in performance, the scenarios include ten tracks, and the "blind spot" scenario has been altered to include several areas that the sensors cannot observe.

As mentioned, the scenarios consisted of ten moving objects, moving with constant velocity in a random direction in the XY plane. Each object was assigned one of three identification classes. The class of each object was modeled as a 3-class vector {C1, C2, C3}. The position and class of these objects can be measured by two sensors. Each sensor can either look "left" or "right." In "left" mode, the sensors can only view tracks whose x-coordinate is less than zero, and in "right" mode, only tracks with x-coordinates greater than zero are visible. Each sensor can operate in a kinematic measurement mode (Mode 1) and a class measurement mode (Mode 2). Although this is a simplistic sensor model, it is chosen to demonstrate the sensor management algorithms for maximizing both kinematic and classification accuracies simultaneously. The measurement accuracies and cost of these modes is as follows. For sensor 1, mode 1 provides position measurement with a variance of 0.01 m$^2$ and a cost of 2 units. Mode 2 provides class information with a cost of 1 unit. This mode is modeled as a confusion matrix with $P_c$ (Probability of correct class declaration)=70% and $P_f$ (Probability of incorrect class declaration)=30% (with equal errors on each of the 2 incorrect classes, i.e., 15%). For sensor 2, the modes have the same measurement accuracies as sensor 1. However the costs are reversed, i.e., mode 1 has a cost of 1 unit while mode 2 has a cost of 2 units.

Figures 6A, 6B:
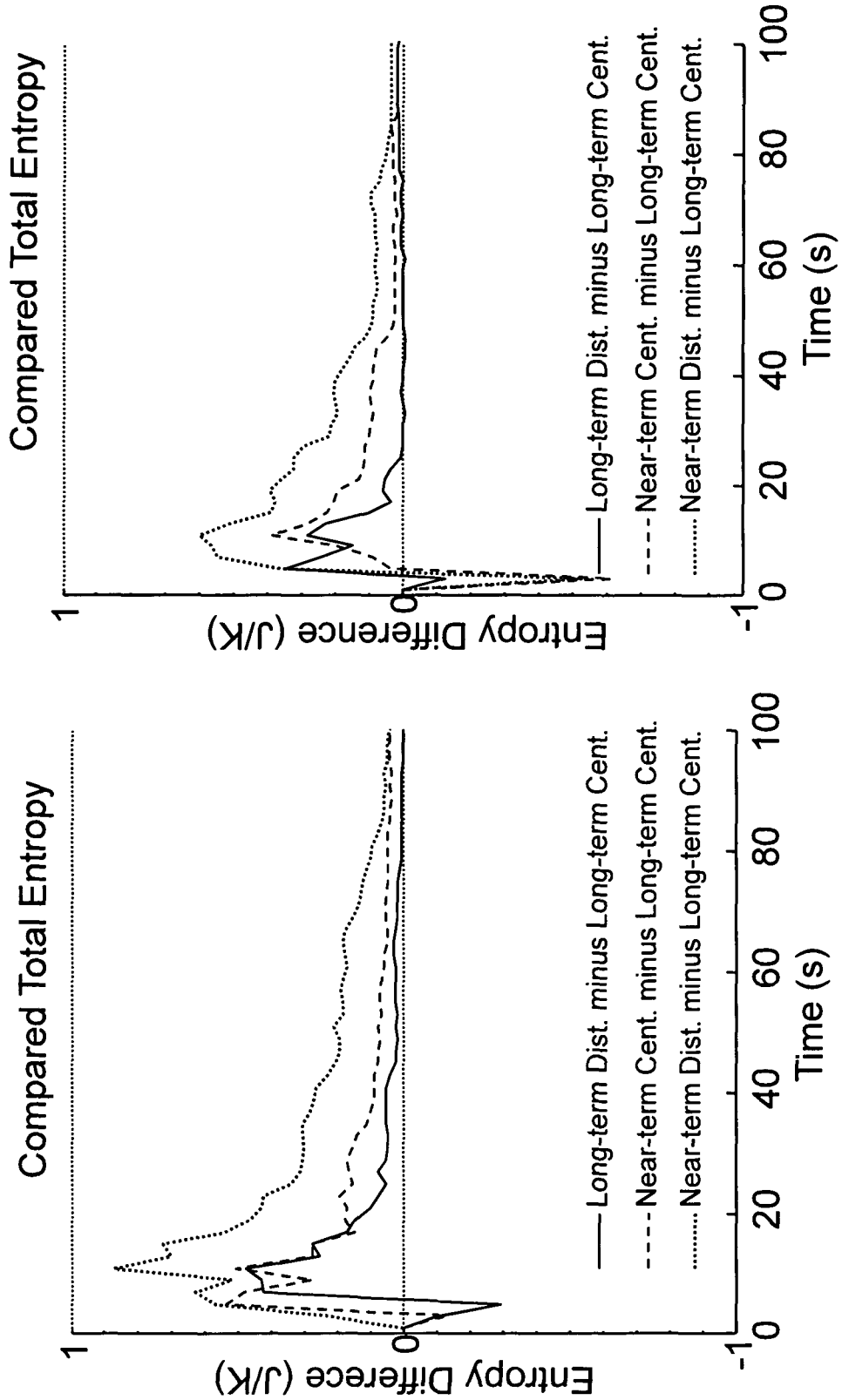
FIG. 6A is a chart illustrating the total entropy values for "all visible" results as compared between the planners.
FIG. 6B is a chart illustrating the total entropy values for "blind spot" results as compared between the planners.

Belief state updates are randomly chosen as needed. In other words, a pre-generated, finite-length random table is not being used. For the sparse parameters, a discount factor of 0.5 and a depth of 2 are used for both the centralized and distributed sparse planners. Results are averaged over 1000 Monte Carlo runs and presented in FIGS. 6A and 6B. FIGS. 6A and 6B are charts illustrating total entropy values as compared between the planners. FIG. 6A illustrates "all visible" results while FIG. 6B illustrates the "blind spot" results.

As shown in FIGS. 6A and 6B, the long-term planners perform notably better than their short-term counterparts in both (i.e., visible and blind) scenarios. Both scenarios show that the long-term planners perform poorly in the first couple seconds. This is expected as the long-term sensors are not attempting to maximize their productivity in the long-term. It is not necessarily true that the action that leads to the lowest entropy value at t=1 will optimally minimize the entropy when t=2. After the planners have had a chance to settle, the long term planners perform better than their short-term counterparts. The magnitude of this difference is small due to limited depth (this example only looked ahead 2 actions), especially when compared to the differences between picking actions randomly and running any of the planners.

On the average, a centralized planner performs slightly better than a distributed planner in both scenarios. This shows that the increase in search depth gives an advantage over near-sighted methods, even when the search space does not consider all joint actions. This is a welcome result, since it was shown that the computational burden of DLTP is far smaller than the burden imposed by CLTP.

The long-term planner has the best overall performance after the first couple seconds. A potentially surprising result is that the two scenarios have almost identical outcomes, with some slight variations that might be attributable to stochastic effects. It is possible that a more pronounced difference would be apparent if the tree-depth or the number of runs was increased. Unfortunately, computation times for CLTP become prohibitive at depth values much larger than 2, so a direct comparison is impractical.

(7) Conclusion

The present invention describes the benefits of distributed short-term and long-term sensor management and scheduling. The results presented in the previous section demonstrate that this method performs similarly to the centralized long-term planners which consider the entire action space, including all joint actions. Since the distributed architecture is markedly less costly, enjoys the resiliency of a distributed network, and yields similar performance to competing long-term planners, it is a substantial improvement over the prior art.

What is claimed is:

1. A distributed resource allocation system, comprising:
a plurality of resources, each of the resources having a resource manager, with each resource manager having a processor and a memory encoded with knowledge of its own resource capabilities and being configured to cause the processor to execute instructions encoded on the memory to perform operations of:
(a) receiving both a desired system state and a current system state;
(b) computing a difference between the desired system state and the current system state; and
   if the difference between the current system state and the desired system state is less than or equal to a predetermined threshold, then exiting; or
   if the difference between the current system state and the desired system state is greater than the predetermined threshold, then perform the following:
   i. based on the resource capabilities and the current system state and desired system state, each resource manager independently determines an expected rate of information gain (RIG) if used to move the current system state toward the desired system state;
   ii. communicate the expected RIG to other resource managers;
   iii. review the expected RIG s and collectively determine with other resource managers which resource has the highest expected RIG in moving the current system state to the desired system state, with the resource with the highest expected RIG then being designated as an allocated resource to perform an allocated task in order to move the current system state toward the desired system state, with the remaining resources then being designated as unallocated resources having unallocated resource managers;
   iv. compute an expected modified current system state due to the expected RIG of the allocated resource;
   v. wherein the unallocated resource managers repeat the operations above until the plurality of resources have been allocated; and
   wherein each allocated resource is further configured to perform the allocated task, which results in an updated current system state, and where upon completion of the allocated task, each corresponding resource manager is configured to repeat operations (a) through (b)(v).

2. A distributed resource allocation system as set forth in claim 1, wherein when determining the expected RIG, each resource manager is configured to perform the following operations:
   generating a possible allocation tree having a base representing a current system state and a plurality of step-wise nodes, each node representing an expected modified current system state based on the possible allocation of the resource to a task and providing a possible expected gain for allocation of the resource to the task, the possible allocation tree being generated until a predetermined fixed horizon of planning;
   computing a total possible expected RIG for each path from each node at the horizon of planning to the base;
   ordering a total possible expected RIG for each path;
   determining a path with the highest total possible expected RIG s; and
   using the path with the highest total possible expected RIG s as the expected RIG s to be communicated to other resource managers.

3. A distributed resource allocation system as set forth in claim 2, wherein the resources are sensors.

4. A distributed resource allocation system as set forth in claim 3, wherein the sensors are configured to observe the current system state and generate signals reflective of the current system state.

5. A distributed resource allocation system as set forth in claim 4, further comprising a fusion manager configured to receive signals from the sensors and generate an updated current system state.

6. A distributed resource allocation system as set forth in claim 5, wherein sensors are configured to sense objects present in a scene.

7. A distributed resource allocation system as set forth in claim 6, wherein the fusion manager includes a tracker module, the tracker module being configured to track objects present in the scene.

8. A distributed resource allocation system as set forth in claim 6, wherein the fusion manager includes a reasoner module, the reasoner module being configured to identify objects present in the scene.

9. A distributed resource allocation system as set forth in claim 6, wherein the fusion manager includes a tracker module, the tracker module being configured to track objects present in the scene, and wherein the fusion manager includes a reasoner module, the reasoner module being configured to identify objects present in the scene, and wherein the fusion manager is configured to track identified objects in the scene across multiple sensors.

10. A distributed resource allocation system as set forth in claim 9, wherein each sensor includes a sensing range and wherein the fusion manager is configured to track identified objects in the scene across multiple sensors, such that as the object travels from the sensing range of a first sensor and into the sensing range of a second sensor, the fusion manager coordinates the identification of the object from the first sensor to the second sensor to provide an updated current system state that reflects motion of the identified object from the first sensor to the second sensor.

11. A distributed resource allocation system as set forth in claim 1, wherein when determining the expected RIG, the operation is performed in at least a first round and a second round;
   wherein in the first round, each resource manager is configured to perform the following operations:
      generating a possible allocation tree having a base representing a current system state and a plurality of step-wise nodes, each node representing an expected modified current system state based on the possible allocation of the resource to a task and providing a possible expected gain for allocation of the resource to the task, the possible allocation tree being generated until a predetermined fixed horizon of planning;
      computing a total possible expected RIG for each path from each node at the horizon of planning to the base;
      ordering a total possible expected RIG for each path;
      determining a path with the highest total possible expected RIG s; and
      using the path with the highest total possible expected RIG s as the expected RIG s to be communicated to other resource managers, with the resource with the highest expected RIG then being designated as an allocated resource to perform an allocated task in order to move the current system state toward the desired system state, with the remaining resources then being, designated as unallocated resources having unallocated resource managers; and wherein in the second round, each unallocated resource manager is configured to perform the following operations:
independently determines an expected RIG if used to move the current system state toward the desired system state;
communicate the expected RIG to other unallocated resource managers; and
review the expected RIG s and collectively determine with other unallocated resource managers which resource has the highest expected RIG in moving the current system state to the desired system state, with the resource with the highest expected RIG then being designated as an allocated resource to perform an allocated task in order to move the current system state toward the desired system state.

12. A method for allocating resources, comprising acts of:
utilizing a plurality of resources, each of the resources having a resource manager, with each resource manager having a processor and a memory encoded with knowledge of its own resource capabilities and being configured to cause the processor to execute instructions encoded on the memory to perform acts of:
(a) receiving both a desired system state and a current system state;
(b) computing a difference between the desired system state and the current system state; and
if the difference between the current system state and the desired system state is less than or equal to a predetermined threshold, then exiting; or
if the difference between the current system state and the desired system state is greater than the predetermined threshold, then performing the following acts:
i. based on the resource capabilities and the current system state and desired system state, each resource manager performs an act of independently determining an expected rate of information gain (RIG) if used to move the current system state toward the desired system state;
ii. communicating the expected RIG to other resource managers;
iii. reviewing the expected RIG s and collectively determining with other resource managers which resource has the highest expected RIG in moving the current system state to the desired system state, with the resource with the highest expected RIG then being designated as an allocated resource to perform an allocated task to move the current system state toward the desired system state, with the remaining resources then being designated as unallocated resources having unallocated resource managers;
iv. computing an expected modified current system state due to the expected RIG of the allocated resource;
v. wherein the unallocated resource managers repeat the acts above until the plurality of resources have been allocated; and
causing the allocated resource to perform the allocated task which results in an updated current system state, and where upon completion of the allocated task, each corresponding resource manager is configured to repeat acts (a) through (b)(v).

13. A method as set forth in claim 12, wherein when determining the expected RIG, each resource manager is further configured to perform the following acts:
generating a possible allocation tree having a base representing a current system state and a plurality of step-wise nodes, each node representing an expected modified current system state based on the possible allocation of the resource to a task and providing a possible expected gain for allocation of the resource to the task, the possible allocation tree being generated until a predetermined fixed horizon of planning;
computing a total possible expected RIG for each path from each node at the horizon of planning to the base;
ordering a total possible expected RIG for each path;
determining a path with the highest total possible expected RIG s; and
using the path with the highest total possible expected RIG s as the expected RIG s to be communicated to other resource managers.

14. A method as set forth in claim 13, wherein in the act of utilizing a plurality of resources, the resources are sensors.

15. A method as set forth in claim 14, wherein the sensors are configured to perform acts of observing the current system state and generating signals reflective of the current system state.

16. A method as set forth in claim 15, further comprising acts of receiving signals from the sensors and generating an updated current system state.

17. A method as set forth in claim 16, further comprising an act of sensing objects present in a scene.

18. A method as set forth in claim 17, further comprising, an act of tracking objects present in the scene.

19. A method as set forth in claim 17, further comprising an act of identifying objects present in the scene.

20. A method as set forth in claim 19, further comprising acts of:
tracking objects present in the scene;
identifying objects present in the scene; and
tracking identified objects in the scene across multiple sensors.

21. A method as set forth in claim 20, further comprising an act of tracking identified objects in the scene across multiple sensors, such that as the object travels from a sensing range of a first sensor and into a sensing range of a second sensor, the identification of the object is coordinated from the first sensor to the second sensor to provide an updated current system state that reflects motion of the identified object from the first sensor to the second sensor.

22. A method as set forth in claim 12, wherein when determining the expected RIG, the act is performed in at least a first round and a second round;
wherein the first round further comprises the following acts:
generating a possible allocation tree having a base representing a current system state and a plurality of step-wise nodes, each node representing an expected modified current system state based on the possible allocation of the resource to a task and providing a possible expected gain for allocation of the resource to the task, the possible allocation tree being generated until a predetermined fixed horizon of planning;
computing a total possible expected RIG for each path from each node at the horizon of planning to the base;
ordering a total possible expected RIG for each path;
determining a path with the highest total possible expected RIG s; and
using the path with the highest total possible expected RIG s as the expected RIG s to be communicated to other resource managers, with the resource with the highest expected RIG then being designated as an allocated resource to perform an allocated task in order to move the current system state toward the desired system state, with the remaining resources then being designated as unallocated resources having unallocated resource managers; and
wherein the second round further comprises the acts of:
independently determining an expected RIG if an unallocated resource is used to move the current system state toward the desired system state;
communicating the expected RIG to other unallocated resource managers; and
reviewing the expected RIG s and collectively determine with other unallocated resource managers which resource has the highest expected RIG in moving the current system state to the desired system state, with the resource with the highest expected RIG then being designated as an allocated resource to perform an allocated task in order to move the current system state toward the desired system state.

23. A computer program product for distributing a plurality of resources, where each of the resources has a resource manager, with each resource manager having knowledge of its own resource capabilities, the computer program product comprising computer-readable instruction means stored on a non-transitory computer-readable medium that are executable by a computer for causing the computer to perform operations of:
(a) receive both a desired system state and a current system state;
(b) compute a difference between the desired system state and the current system state; and
if the difference between the current system state and the desired system state is less than or equal to a predetermined threshold, then exiting; or
if the difference between the current system state and the desired system state is greater than the predetermined threshold, then performing the following operations:
i. based on the resource capabilities and the current system state and desired system state, determining an expected rate of information gain (RIG) if used to move the current system state toward the desired system state;
ii. communicate the expected RIG to other resource managers;
iii. review the expected RIG s and collectively determine with other resource managers which resource has the highest expected RIG in moving the current system state to the desired system state, with the resource with the highest expected RIG then being designated as an allocated resource to perform an allocated task in order to move the current system state toward the desired system state, with the remaining, resources then being designated as unallocated resources having unallocated resource managers;
iv. compute an expected modified current system state due to the expected RIG of the allocated resource;
v. wherein if designated as an unallocated resource manager, repeat the operations above until the plurality of resources have been allocated; and
causing the resource to perform the allocated task which results in an updated current system state, and where upon completion of the allocated task, the corresponding resource manager is configured to repeat operations (a) through (b)(v).

24. A computer program product as set forth in claim 23, further comprising instruction means for causing a computer to perform operations of:
generating a possible allocation tree having a base representing a current system state and a plurality of step-wise nodes, each node representing an expected modified current system state based on the possible allocation of the resource to a task and providing a possible expected gain for allocation of the resource to the task, the possible allocation tree being generated until a predetermined fixed horizon of planning;
computing a total possible expected RIG for each path from each node at the horizon of planning to the base;
ordering a total possible expected RIG for each path;
determining a path with the highest total possible expected RIG s; and
using the path with the highest total possible expected RIG s as the expected RIG s to be communicated to other resource managers.

25. A computer program product as set forth in claim 24, further comprising instruction means for causing a computer to utilize a sensor as the resource.

26. A computer program product as set forth in claim 25, further comprising instruction means for causing the sensor to observe the current system state and generate signals reflective of the current system state.

27. A computer program product as set forth in claim 26, further comprising instruction means for causing the computer to receive signals from the sensor and generate an updated current system state.

28. A computer program product as set forth in claim 27, further comprising, instruction means for causing the sensor to sense objects present in a scene.

29. A computer program product as set forth in claim 28, further comprising instruction means for causing the computer to track objects present in the scene.

30. A computer program product as set forth in claim 28, further comprising instruction means for causing the computer to identify objects present in the scene.

31. A computer program product as set forth in claim 28, further comp instruction means for causing the computer to perform operations of:
tracking objects present in the scene;
identifying objects present in the scene; and
tracking identified objects in the scene across multiple sensors.

32. A computer program product as set forth in claim 31, further comprising instruction means for causing the computer to perform an operation of tracking identified objects in the scene across multiple sensors, such that as the object travels from a sensing range of a first sensor and into a sensing range of a second sensor, the identification of the object is coordinated from the first sensor to the second sensor to provide an updated current system state that reflects motion of the identified object from the first sensor to the second sensor.

33. A computer program product as set forth in claim 23, further comprising instruction means for causing a computer to perform operations of determining the expected RIG in at least a first round and a second round;
wherein in the first round, each resource manager is configured to perform the following operations:
generating a possible allocation tree having a base representing a current system state and a plurality of step-wise nodes, each node representing an expected modified current system state based on the possible allocation of the resource to a task and providing a possible expected gain for allocation of the resource to the task, the possible allocation tree being generated until a predetermined fixed horizon of planning;
computing a total possible expected RIG for each path from each node at the horizon of planning to the base;
ordering a total possible expected RIG for each path;
determining a path with the highest total possible expected RIG s; and using the path with the highest total possible expected RIG s as the expected RIG s to be communicated to other resource managers, with the resource with the highest expected RIG then being designated as an allocated resource to perform an allocated task in order to move the current system state toward the desired system state, with the remaining resources then being designated as unallocated resources having unallocated resource managers; and wherein in the second round, each unallocated resource manager is configured to perform the following operations:

independently determines an expected RIG if used to move the current system state toward the desired system state;

communicate the expected RIG to other unallocated resource managers; and review the expected RIG s and collectively determine with other unallocated resource managers which resource has the highest expected RIG in moving the current system state to the desired system state, with the resource with the highest expected RIG then being designated as an allocated resource to perform an allocated task in order to move the current system state toward the desired system state.

* * * * *